United States Patent
Minefuji

(10) Patent No.: US 6,597,513 B2
(45) Date of Patent: Jul. 22, 2003

(54) ZOOM LENS SYSTEM

(75) Inventor: Nobutaka Minefuji, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/094,607

(22) Filed: Mar. 12, 2002

(65) Prior Publication Data

US 2003/0043474 A1 Mar. 6, 2003

(30) Foreign Application Priority Data

Mar. 19, 2001 (JP) ........................................ 2001-078881

(51) Int. Cl.$^7$ ................................................ G02B 15/14
(52) U.S. Cl. ........................................ 359/689; 359/683
(58) Field of Search ................................ 359/689, 683

(56) References Cited

U.S. PATENT DOCUMENTS 6,308,011 B1   10/2001   Wachi et al.
6,417,973 B2 *  7/2002   Mihara et al. ............... 359/684

FOREIGN PATENT DOCUMENTS

| JP | 6-94996 | 4/1994 |
| JP | 1039214 | 2/1998 |
| JP | 11194274 | 7/1999 |

OTHER PUBLICATIONS

English Language Translation for JP Appl. No. 6–94996.
English Language Translation for JP Appl. No. 10–39214.
English Language Translation for JP Appl. No. 11–194274.

* cited by examiner

Primary Examiner—Scott J. Sugarman
Assistant Examiner—Deborah A. Raizen
(74) Attorney, Agent, or Firm—Greenblum & Bernstein, P.L.C.

(57) ABSTRACT

A zoom lens system including a first to third lens groups, and zooming is performed by respectively moving the first to third lens groups. The zoom lens system satisfies the following conditions:

$$1.3 < |f1/f2| < 1.8 \quad (1)$$

$$2.0 < f3/fw < 3.4 \quad (2)$$

$$1.05 < m3t/m3w < 1.25 \quad (3)$$

wherein fw: the focal length of the entire the zoom lens system at the short focal length extremity;

f1: the focal length of the first lens group;

f2: the focal length of the second lens group;

f3: the focal length of the third lens group;

m3w: the magnification of the third lens group at the short focal length extremity, when an object at infinity is in an in-focus state;

m3t designates the magnification of the third lens group at the long focal length extremity, when an object at infinity is in an in-focus state.

7 Claims, 15 Drawing Sheets

Fig.1
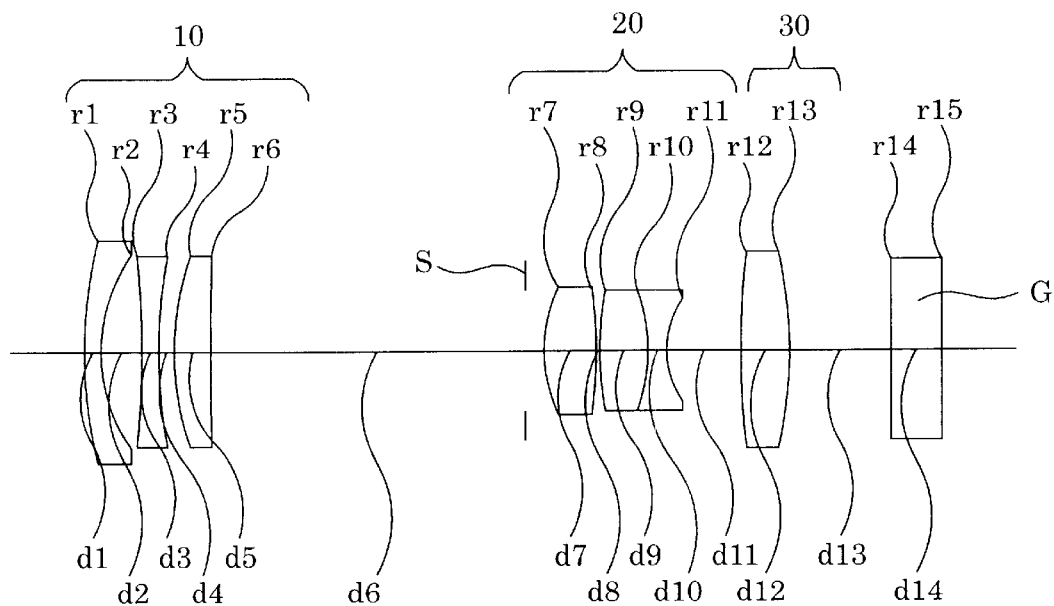
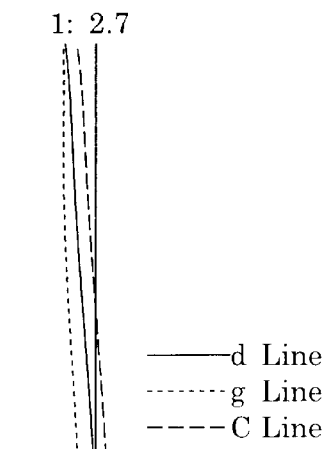
Fig.2A
1: 2.7
——— d Line
········ g Line
- - - - C Line
-0.1  0.1
SPHERICAL
ABERRATION
CHROMATIC
ABERRATION
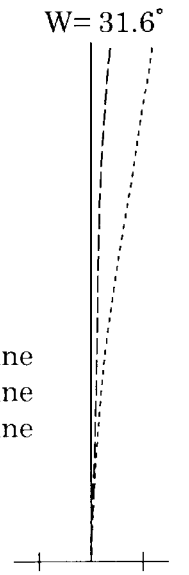
Fig.2B
W= 31.6°
-0.01  0.01
LATERAL
CHROMATIC
ABERRATION
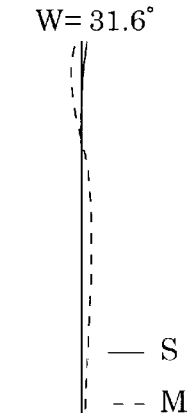
Fig.2C
W= 31.6°
——— S
- - - M
-0.1  0.1
ASTIGMATISM
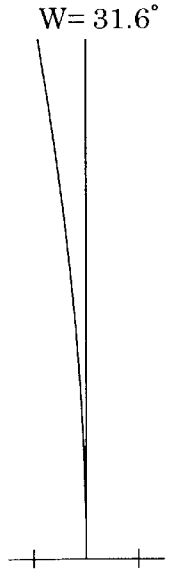
Fig.2D
W= 31.6°
-5.0 (%) 5.0
DISTORTION

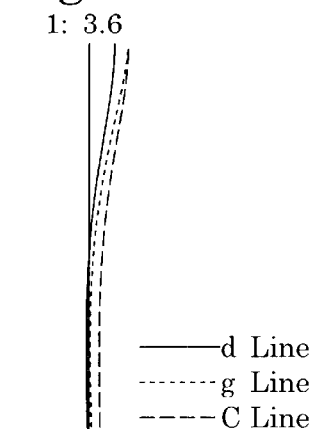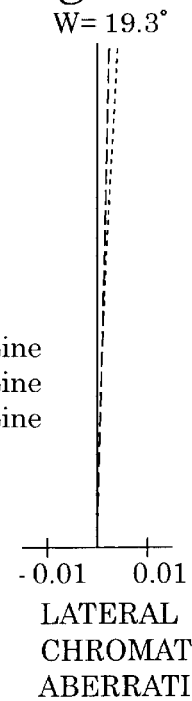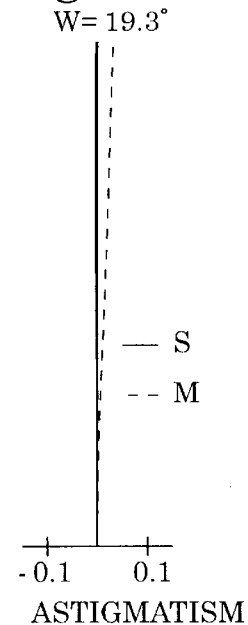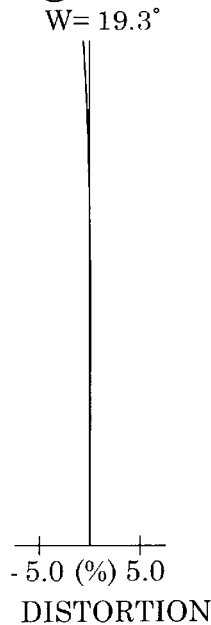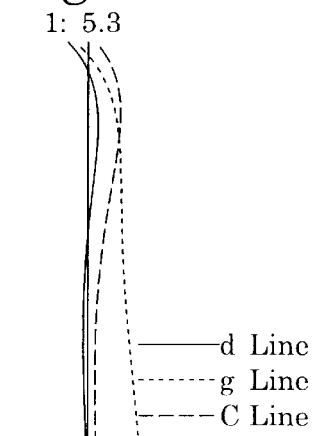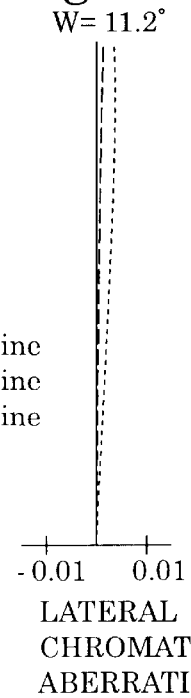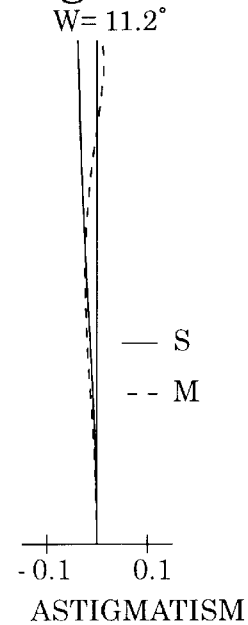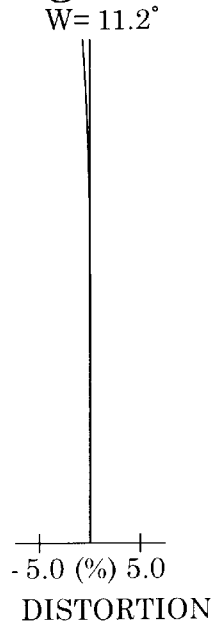

Fig.5
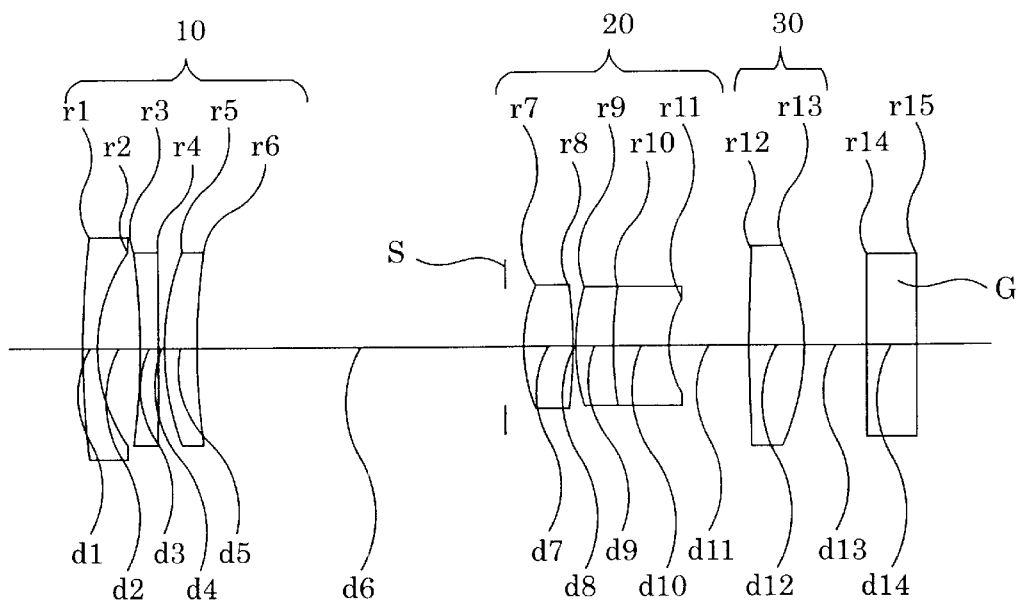
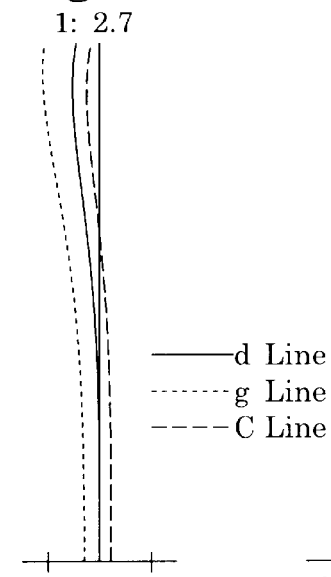
Fig.6A
1: 2.7
—— d Line
········ g Line
—— — C Line
-0.1   0.1
SPHERICAL
ABERRATION
CHROMATIC
ABERRATION
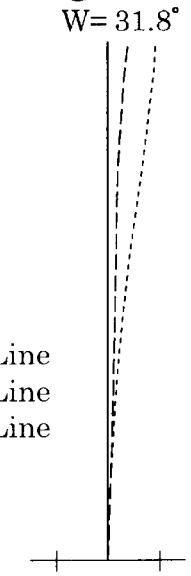
Fig.6B
W= 31.8°
-0.01   0.01
LATERAL
CHROMATIC
ABERRATION
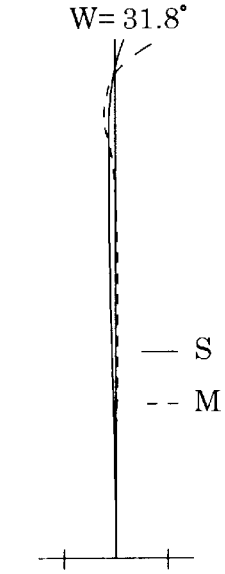
Fig.6C
W= 31.8°
—— S
- - M
-0.1   0.1
ASTIGMATISM
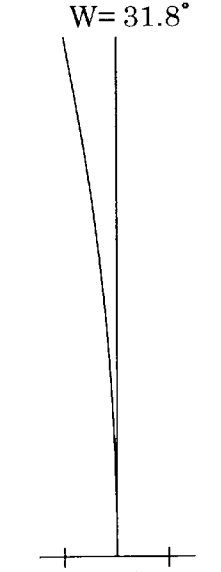
Fig.6D
W= 31.8°
-5.0 (%) 5.0
DISTORTION

Fig.7A
1: 3.6

— d Line
····· g Line
--- C Line

-0.1   0.1
SPHERICAL
ABERRATION

CHROMATIC
ABERRATION

Fig.7B
W= 19.0°

-0.01   0.01
LATERAL
CHROMATIC
ABERRATION

-0.1   0.1
ASTIGMATISM

Fig.7D
W= 19.0°

-5.0 (%) 5.0
DISTORTION

Fig.8A
1: 5.2

— d Line
····· g Line
--- C Line

-0.1   0.1
SPHERICAL
ABERRATION

CHROMATIC
ABERRATION

Fig.8B
W= 11.5°

-0.01   0.01
LATERAL
CHROMATIC
ABERRATION

-0.1   0.1
ASTIGMATISM

Fig.8D
W= 11.5°

-5.0 (%) 5.0
DISTORTION

1: 2.7

—— d Line
······ g Line
- - - - C Line

-0.1   0.1
SPHERICAL
ABERRATION

CHROMATIC
ABERRATION

W= 31.6°

-0.01   0.01
LATERAL
CHROMATIC
ABERRATION

W= 31.6°

—— S
- - M

-0.1   0.1
ASTIGMATISM

W= 31.6°

-5.0 (%) 5.0
DISTORTION

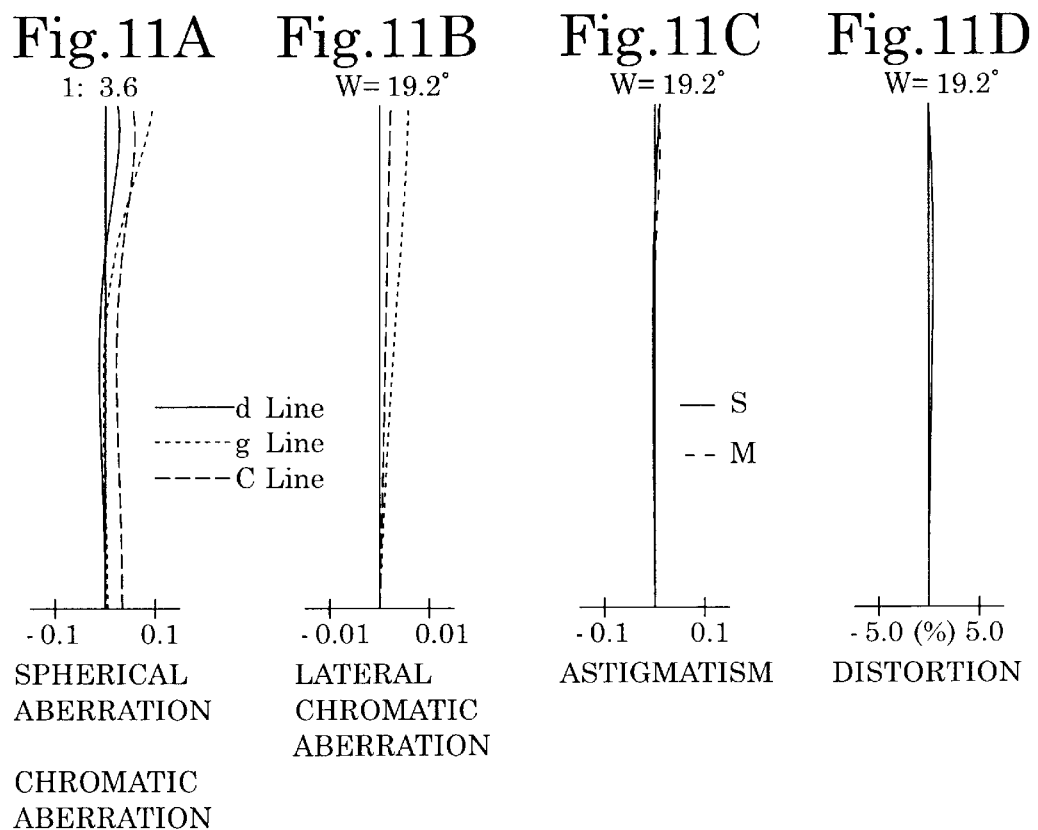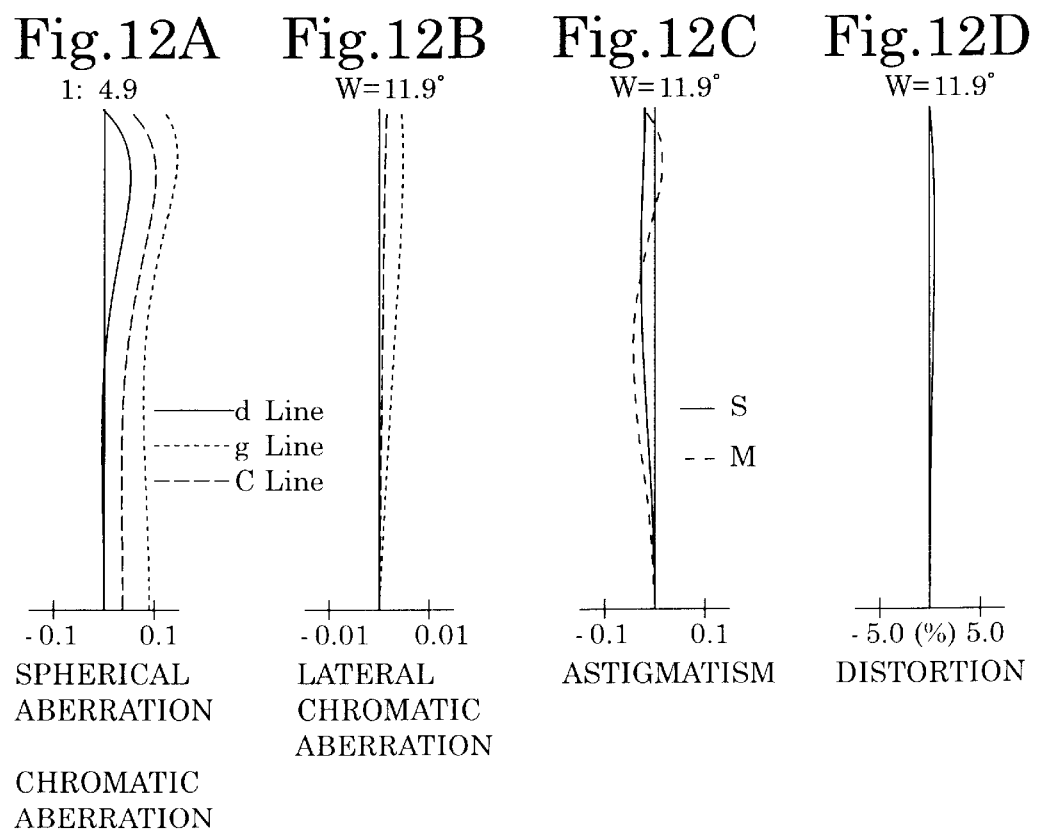

1: 2.7

—— d Line
------ g Line
---- C Line

-0.1  0.1
SPHERICAL
ABERRATION

CHROMATIC
ABERRATION

W= 31.5°

-0.01  0.01
LATERAL
CHROMATIC
ABERRATION

W= 31.5°

— S
-- M

-0.1  0.1
ASTIGMATISM

W= 31.5°

-5.0 (%) 5.0
DISTORTION

1: 3.6

—— d Line
------ g Line
---- C Line

-0.1  0.1
SPHERICAL
ABERRATION

CHROMATIC
ABERRATION

W= 18.9°

-0.01  0.01
LATERAL
CHROMATIC
ABERRATION

W= 18.9°

—— S
-- M

-0.1  0.1
ASTIGMATISM

W= 18.9°

-5.0 (%) 5.0
DISTORTION

1: 5.0

—— d Line
------ g Line
---- C Line

-0.1  0.1
SPHERICAL
ABERRATION

CHROMATIC
ABERRATION

W= 11.7°

-0.01  0.01
LATERAL
CHROMATIC
ABERRATION

W= 11.7°

—— S
-- M

-0.1  0.1
ASTIGMATISM

W= 11.7°

-5.0 (%) 5.0
DISTORTION

Fig.17
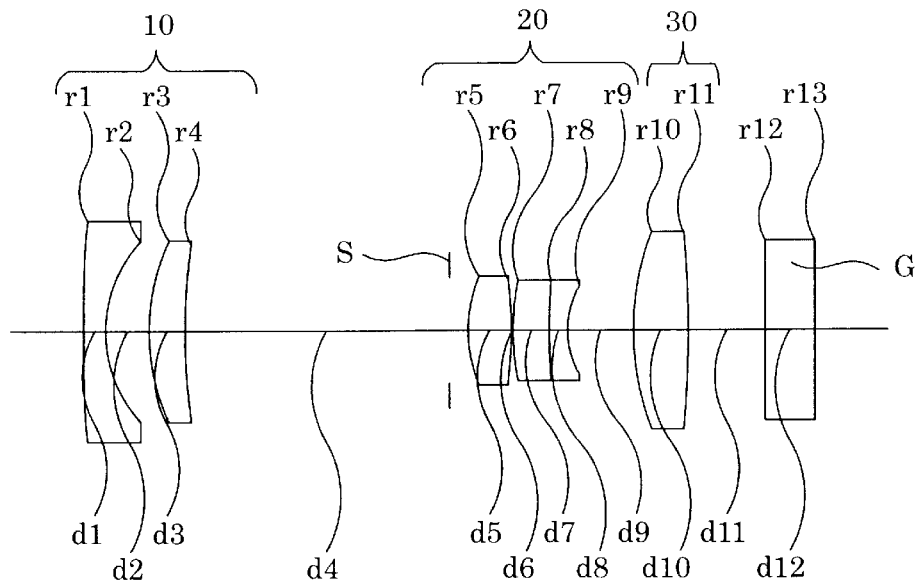
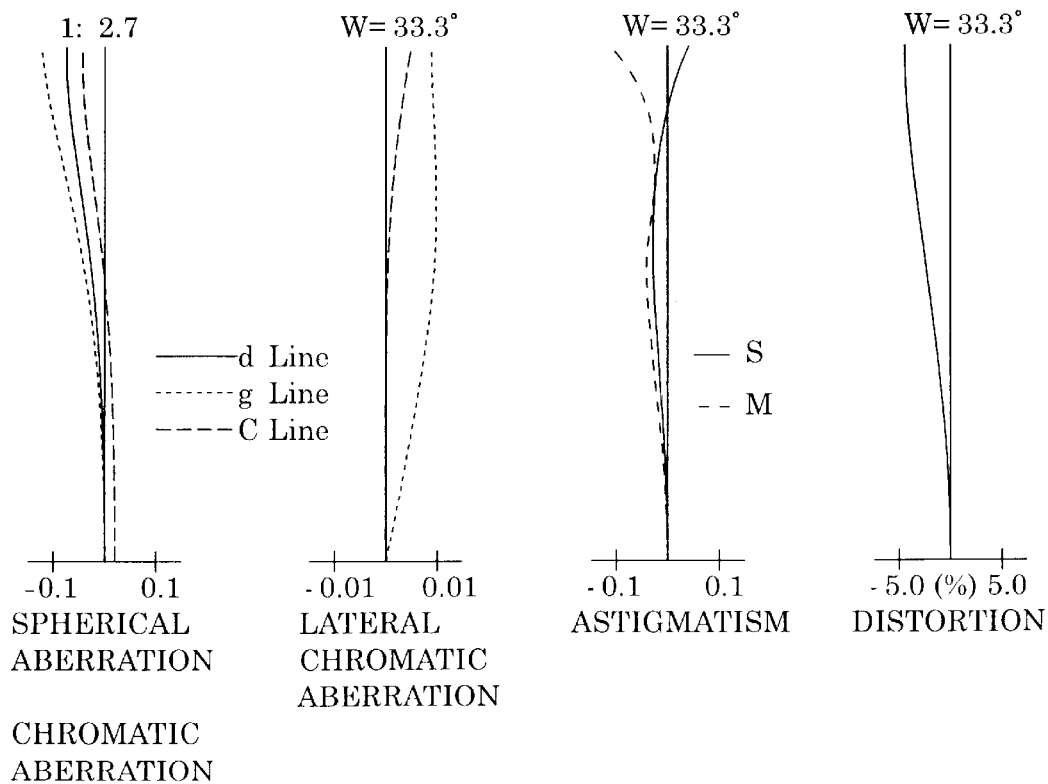
Fig.18A
1: 2.7
-0.1  0.1
SPHERICAL
ABERRATION
CHROMATIC
ABERRATION
Fig.18B
W= 33.3°
-0.01  0.01
LATERAL
CHROMATIC
ABERRATION
Fig.18C
W= 33.3°
-0.1  0.1
ASTIGMATISM
Fig.18D
W= 33.3°
-5.0 (%) 5.0
DISTORTION

1: 3.9

—— d Line
······ g Line
- - - C Line

-0.1   0.1
SPHERICAL
ABERRATION

CHROMATIC
ABERRATION

W= 19.5°

-0.01   0.01
LATERAL
CHROMATIC
ABERRATION

W= 19.5°

—— S
- - M

-0.1   0.1
ASTIGMATISM

W= 19.5°

-5.0 (%) 5.0
DISTORTION

1: 4.7

—— d Line
······ g Line
- - - C Line

-0.1   0.1
SPHERICAL
ABERRATION

CHROMATIC
ABERRATION

W= 14.7°

-0.01   0.01
LATERAL
CHROMATIC
ABERRATION

W= 14.7°

—— S
- - M

-0.1   0.1
ASTIGMATISM

W= 14.7°

-5.0 (%) 5.0
DISTORTION

Fig.21
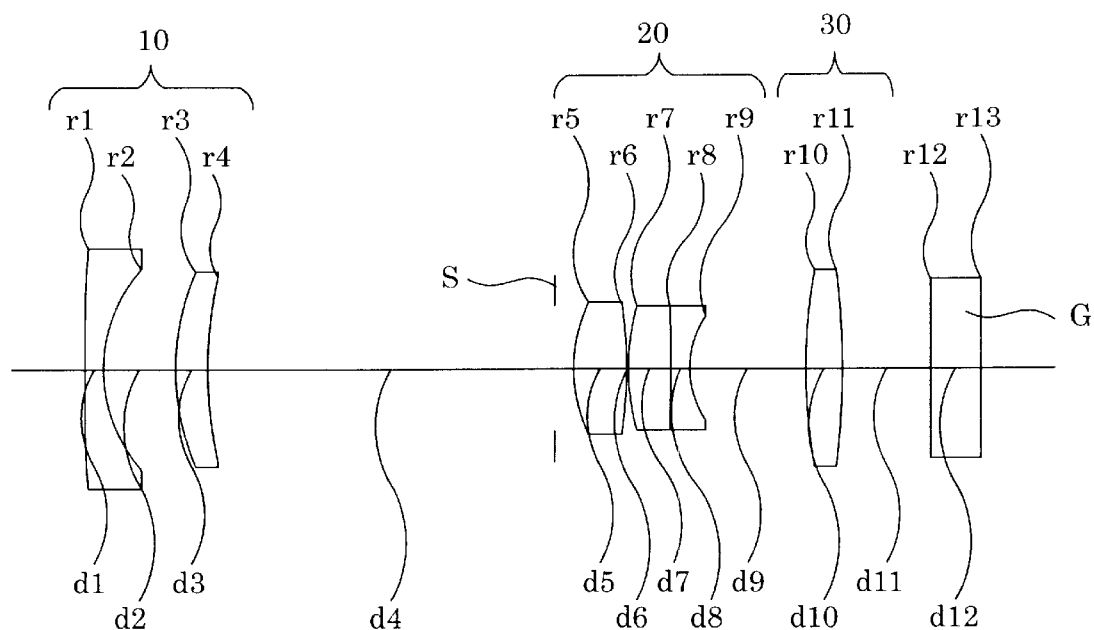
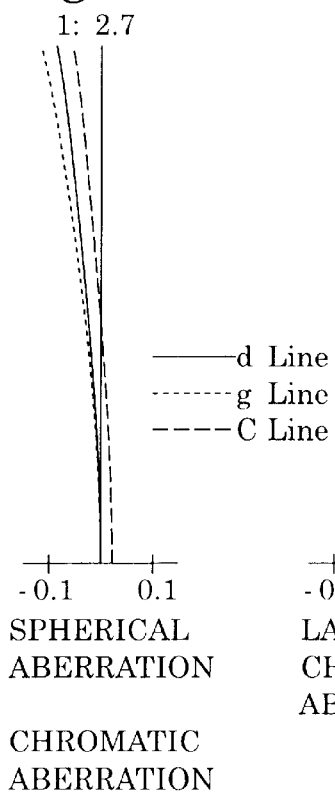
Fig.22A
1: 2.7
-0.1   0.1
SPHERICAL
ABERRATION
CHROMATIC
ABERRATION
—— d Line
······ g Line
-- -- C Line
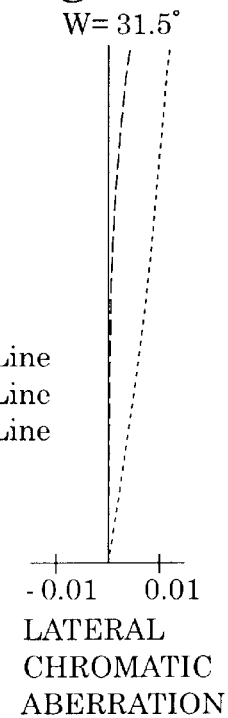
Fig.22B
W= 31.5°
-0.01   0.01
LATERAL
CHROMATIC
ABERRATION
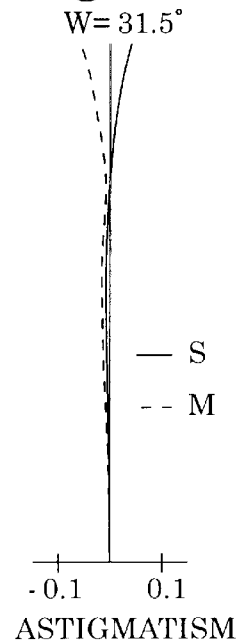
Fig.22C
W= 31.5°
-0.1   0.1
ASTIGMATISM
—— S
-- -- M
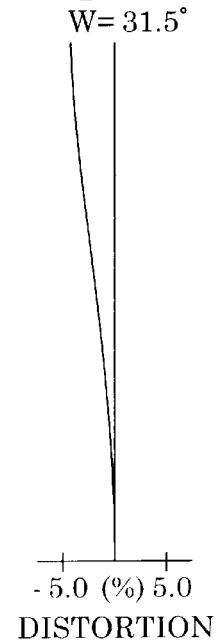
Fig.22D
W= 31.5°
-5.0 (%) 5.0
DISTORTION

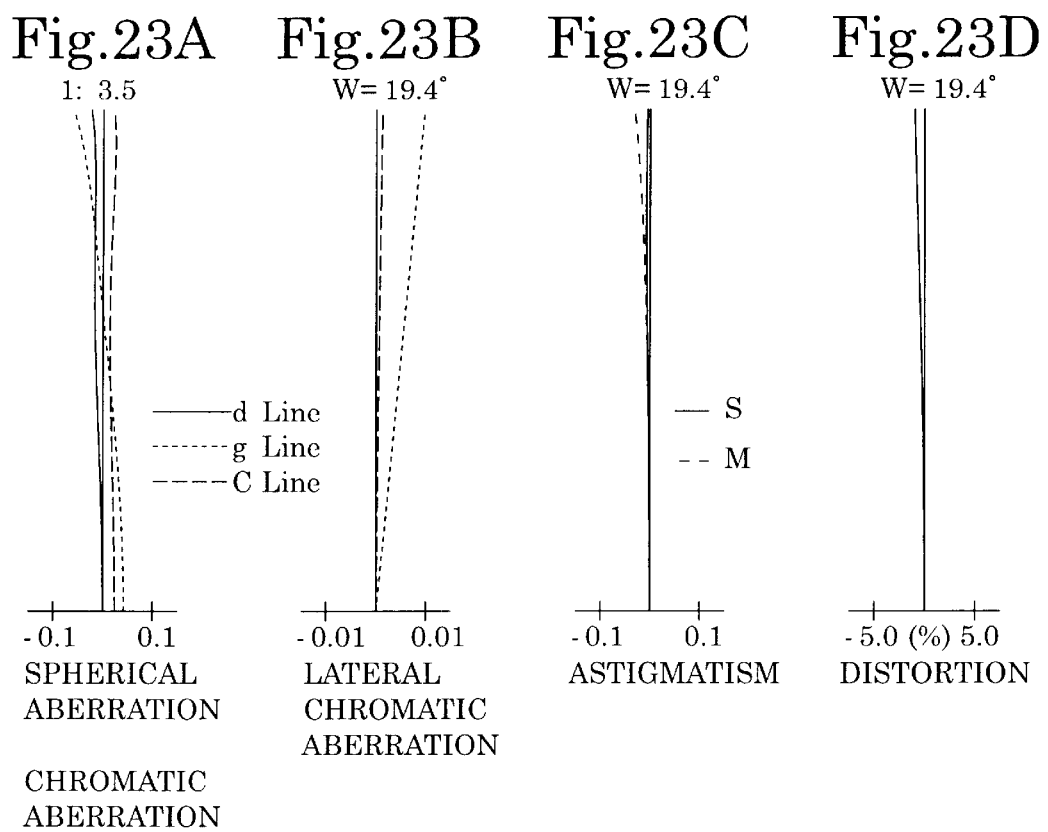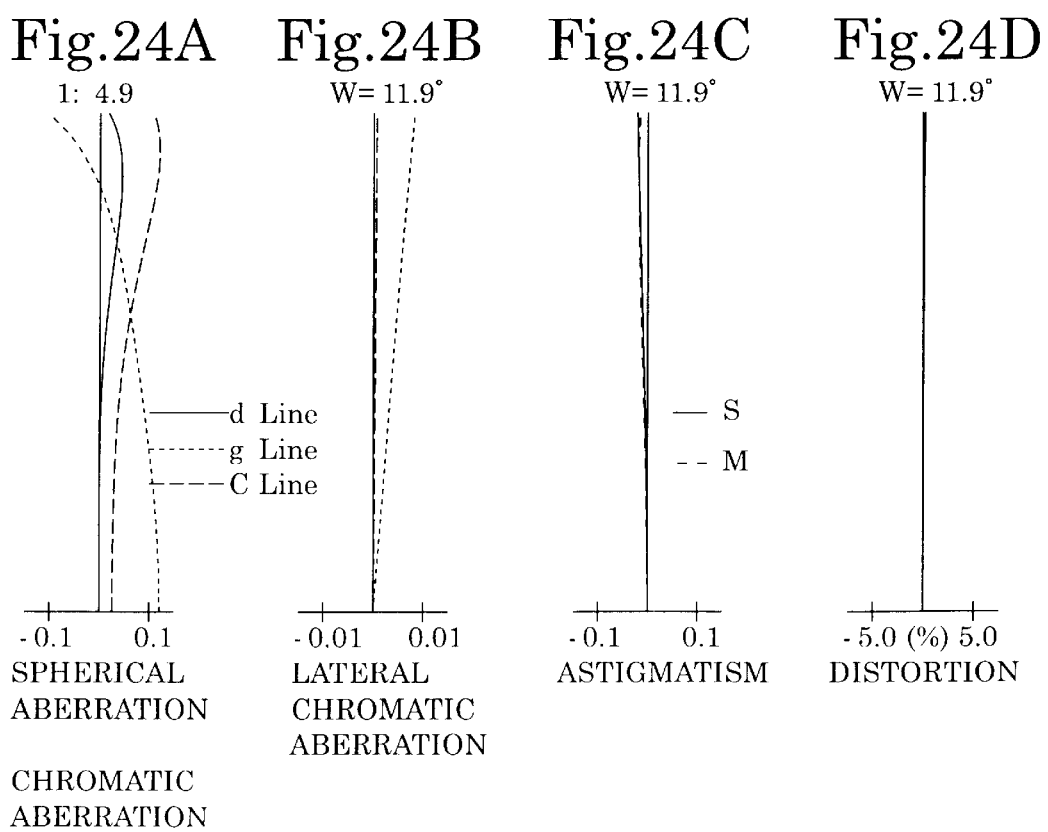

Fig.25
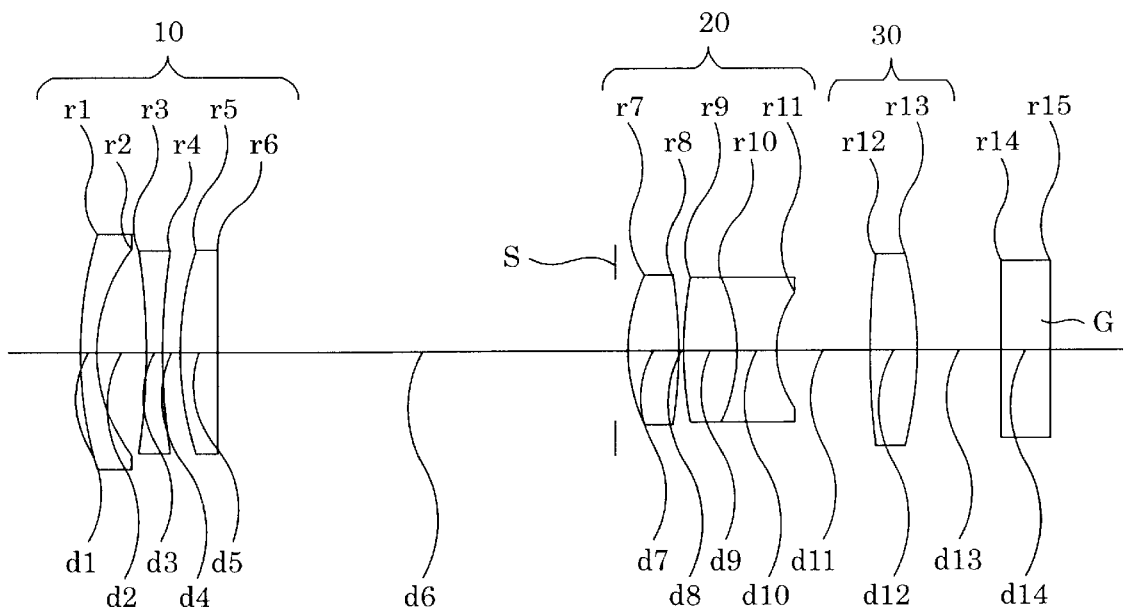
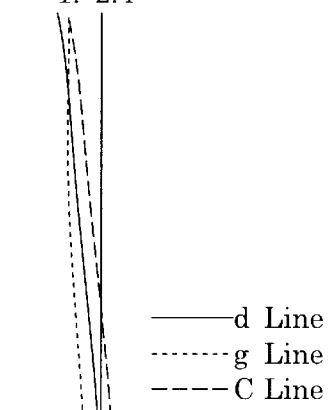
Fig.26A
1: 2.4
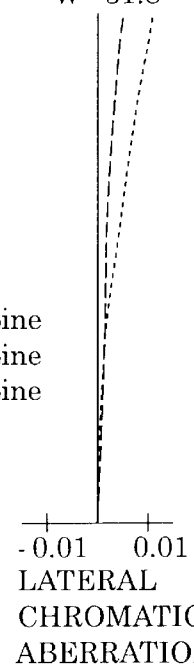
-0.1  0.1
SPHERICAL
ABERRATION
CHROMATIC
ABERRATION
——— d Line
········ g Line
----- C Line
Fig.26B
W= 31.8°
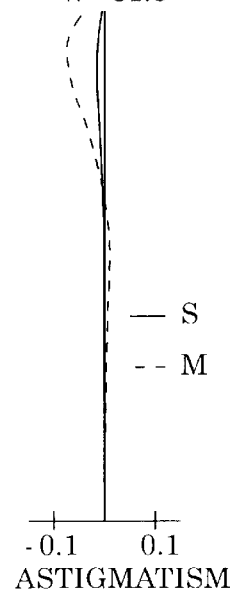
-0.01  0.01
LATERAL
CHROMATIC
ABERRATION
Fig.26C
W= 31.8°
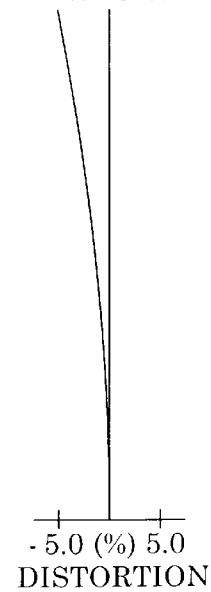
-0.1  0.1
ASTIGMATISM
—— S
-- M
Fig.26D
W= 31.8°
-5.0 (%) 5.0
DISTORTION

1: 3.8

-0.1  0.1
SPHERICAL
ABERRATION

CHROMATIC
ABERRATION

—— d Line
------- g Line
---- C Line

W= 14.6°

-0.01  0.01
LATERAL
CHROMATIC
ABERRATION

W= 14.6°

-0.1  0.1
ASTIGMATISM

—— S
-- M

W= 14.6°

-5.0 (%) 5.0
DISTORTION

1: 5.6

-0.1  0.1
SPHERICAL
ABERRATION

CHROMATIC
ABERRATION

—— d Line
------- g Line
---- C Line

W= 8.7°

-0.01  0.01
LATERAL
CHROMATIC
ABERRATION

W= 8.7°

-0.1  0.1
ASTIGMATISM

—— S
-- M

W= 8.7°

-5.0 (%) 5.0
DISTORTION

Petracted Position

Short Focal Length Extremity

Intermediate Focal Length Position

Long Focal Length Extremity

ZOOM LENS SYSTEM

BACKGROUND OF THE INVENTION

1. Field of the Invention

The present invention relates to a zoom lens system to be used in a small and light-weight video camera or digital camera and the like having the f-number (f/D: f: the focal length; D: a diameter) of more than 1:2.8 at the short focal length extremity, and a zoom ratio of 2.5 to 4.0, and in particular, relates to a zoom lens system which can make the overall length thereof, at the retracted position, shorter.

2. Description of the Prior Art

In recent years, along with further miniaturization and integration of imaging devices and the elements contained therein, the zoom lens system used in a video camera and an electronic still camera have been required to be further miniaturized and to have higher quality.

Furthermore, a solid-state imaging device, such as a CCD, which is used in a video camera or electronic still camera and the like is provided with a color separation filter in the close vicinity of a light receiving surface thereof. Accordingly, if a bundle of light rays emitted from the zoom lens system is inclined with respect to the optical axis, the bundle of light rays is blocked by the color separation filter, i.e., an eclipse occurs, so that the amount of peripheral illumination is reduced and unevenness of color occurs due to the characteristics of the color separation filter. Therefore in order to achieve suitable telecentricity, namely, in order to make a bundle of light rays incident on the light receiving surface at a right angle, an optical system in which the exit pupil is positioned distant from the image plane is required.

Still further, in a recent zoom compact camera, it is important to make the size thereof smaller when the photographing lens system is advanced from the retracted position. In addition, compactness of the camera when the photographing lens system is retracted, i.e., in the retracted position, has also become important so that a user can easily carry the camera with him/her. In other words, it is desirable for the above-explained zoom lens system to be thinner when retracted. For this purpose, and in order to reduce mechanical load on the zoom lens system, it is required to make the traveling distances of the lens groups thereof much shorter.

In a compact zoom lens system of the prior art, a two-lens-group zoom lens system, which includes a negative first lens group and a positive second lens group, is known. However, such a two-lens-group zoom lens system is not desirable for a zoom lens system in which a solid-state imaging device, such as a CCD, is used, since the exit pupil is close to the image plane.

As an attempt to overcome the above drawbacks, a three-lens-group zoom lens system in which a positive lens group, which is either immovable or movable, is provided between the second lens group and the solid-state imaging device has been proposed, as disclosed in Japanese Unexamined Laid Open Patent Publications (hereinafter, JP) No. Hei-6-94996, No. Hei-10-39214 and No. Hei-11-194274.

The zoom lens system of JP-6-94996 has disclosed improved telecentricity due to the three-lens-group arrangement; however, the zoom ratio is still about 2.0, and requirements of a high zoom ratio is not yet satisfied.

The lens arrangements of JP-10-39214 and JP-6-94996 are the same, and both satisfy the zoom ratio of 3. However, compactness when the zoom lens system is retracted is not yet satisfactorily attained, since the overall length of the zoom lens system is longer with respect to the focal length.

In JP-11-194274, the zoom lens system includes the first lens group constituted by the two lens elements with at least one aspherical surface formed thereon, and attains the zoom ratio of 3 with the seven lens elements constituting the three lens groups. In other words, miniaturization of the zoom lens system has been attained. However, relatively large spherical aberration and curvature of field occur, with respect to the focal length. Therefore the zoom lens system of JP-11-194274 cannot satisfy requirements of higher resolution in proportion to a finer pixel size in recent years. Moreover, since the second lens group is constituted by four lens elements, there still is room for improvement on cost reduction.

SUMMARY OF THE INVENTION

The present invention provides a zoom lens system which (i) is used in a small and light-weight video camera or digital camera and the like having the f-number of more than 1:2.8 at the short focal length extremity, and a zoom ratio of about 2.5 to 4.0, (ii) has the half angle-of-view of more than 30° at the short focal length extremity, (iii) has sufficient image-forming performance suitable for a solid-state imaging device of higher resolution, and (iv) can be made much compact when retracted.

As an aspect of the present invention, there is provided a zoom lens system including a negative first lens group, a positive second lens group, and a positive third lens group, in this order from the object. Zooming is performed by moving the first to third lens groups respectively along the optical axis. The zoom lens system satisfies the following conditions:

$$1.3 < |f1/f2| < 1.8 \tag{1}$$

$$2.0 < f3/fw < 3.4 \tag{2}$$

$$1.05 < m3t/m3w < 1.25 \tag{3}$$

wherein fw designates the focal length of the entire the zoom lens system at the short focal length extremity;

f1 designates the focal length of the negative first lens group;

f2 designates the focal length of the positive second lens group;

f3 designates the focal length of the positive third lens group;

m3w designates the magnification of the positive third lens group at the short focal length extremity, when an object at infinity is in an in-focus state;

m3t designates the magnification of the positive third lens group at the long focal length extremity, when an object at infinity is in an in-focus state.

In the positive second lens group, the most image-side surface thereof is a divergent surface constituted by a concave surface, and satisfies the following condition:

$$0.4 < R/fw < 1.0 \tag{4}$$

wherein

R designates the radius of curvature of the most image-side surface of the positive second lens group.

For example, the positive second lens group includes a positive lens element with at least one aspherical surface, and cemented lens elements having a positive lens element and a negative lens element, in this order from the object. In other words, the two lens groups are constituted by the three lens elements. The aspherical surface is formed so that the positive power becomes weaker toward the periphery than the positive power generated by a spherical lens surface having a radius of curvature in the paraxial region. The positive second lens group satisfies the following conditions:

$$-0.1 < Np - Nn < 0.2 \quad (5)$$

$$5 < vp - vn < 30 \quad (6)$$

wherein

Np designates the refractive index of the d-line of the positive lens element of the cemented lens elements;

Nn designates the refractive index of the d-line of the negative lens element of the cemented lens elements;

vp designates the Abbe number of the positive lens element of the cemented lens elements; and vn designates the Abbe number of the negative lens element of the cemented lens elements.

On the other hand, the negative first lens group can be constituted by a negative meniscus lens element having the convex surface facing toward the object, a negative lens element, and a positive lens element having a convex surface facing toward the object, in this order from the object. In this case where the three lens groups are constituted by the three lens elements, each lens surface of the first lens group can be formed as a spherical surface. Alternatively, the negative first lens group can be constituted by a negative lens element having a concave surface facing toward the image, and a positive lens element having a convex surface facing toward the object, in this order from the object. In other words, the two lens groups are constituted by the two lens elements. Furthermore, in the negative first lens group, at least one aspherical surface, on which the positive power becomes stronger toward the periphery than the positive power generated by a spherical lens surface having a radius of curvature in the paraxial region, can be provided.

Focusing can be carried out by either the negative first lens group or the positive third lens group. Note that constituting the positive third lens group by a biconvex single lens element is cost-effective.

The present disclosure relates to subject matter contained in Japanese Patent Application No. 2001-78881 (filed on Mar. 19, 2001) which is expressly incorporated herein in its entirety.

BRIEF DESCRIPTION OF THE DRAWINGS

The present invention will be discussed below in detail with reference to the accompanying drawings, in which:

FIG. 1 shows a lens arrangement of a zoom lens system according to a first embodiment of the present invention;

FIGS. 2A, 2B, 2C and 2D show aberrations occurred in the lens arrangement shown in FIG. 1, at the short focal length extremity;

FIGS. 3A, 3B, 3C and 3D show aberrations occurred in the lens arrangement shown in FIG. 1, at an intermediate focal length position;

FIGS. 4A, 4B, 4C and 4D show aberrations occurred in the lens arrangement shown in FIG. 1, at the long focal length extremity;

FIG. 5 shows a lens arrangement of a zoom lens system according to a second embodiment of the present invention;

FIGS. 6A, 6B, 6C and 6D show aberrations occurred in the lens arrangement shown in FIG. 5, at the short focal length extremity;

FIGS. 7A, 7B, 7C and 7D show aberrations occurred in the lens arrangement shown in FIG. 5, at an intermediate focal length position;

FIGS. 8A, 8B, 8C and 8D show aberrations occurred in the lens arrangement shown in FIG. 5, at the long focal length extremity;

FIGS. 11A, 11B, 11C and 11D show aberrations occurred in the lens arrangement shown in FIG. 9, at an intermediate focal length position;

FIGS. 12A, 12B, 12C and 12D show aberrations occurred in the lens arrangement shown in FIG. 9, at the long focal length extremity;

FIG. 17 shows a lens arrangement of a zoom lens system according to a fifth embodiment of the present invention;

FIGS. 18A, 18B, 18C and 18D show aberrations occurred in the lens arrangement shown in FIG. 17, at the short focal length extremity;

FIG. 21 shows a lens arrangement of a zoom lens system according to a sixth embodiment of the present invention;

FIGS. 22A, 22B, 22C and 22D show aberrations occurred in the lens arrangement shown in FIG. 21, at the short focal length extremity;

FIGS. 23A, 23B, 23C and 23D show aberrations occurred in the lens arrangement shown in FIG. 21, at an intermediate focal length position;

FIGS. 24A, 24B, 24C and 24D show aberrations occurred in the lens arrangement shown in FIG. 21, at the long focal length extremity;

FIG. 25 shows a lens arrangement of a zoom lens system according to a seventh embodiment of the present invention;

FIGS. 26A, 26B, 26C and 26D show aberrations occurred in the lens arrangement shown in FIG. 25, at the short focal length extremity;

DESCRIPTION OF THE PREFERRED EMBODIMENTS

Figure 29:
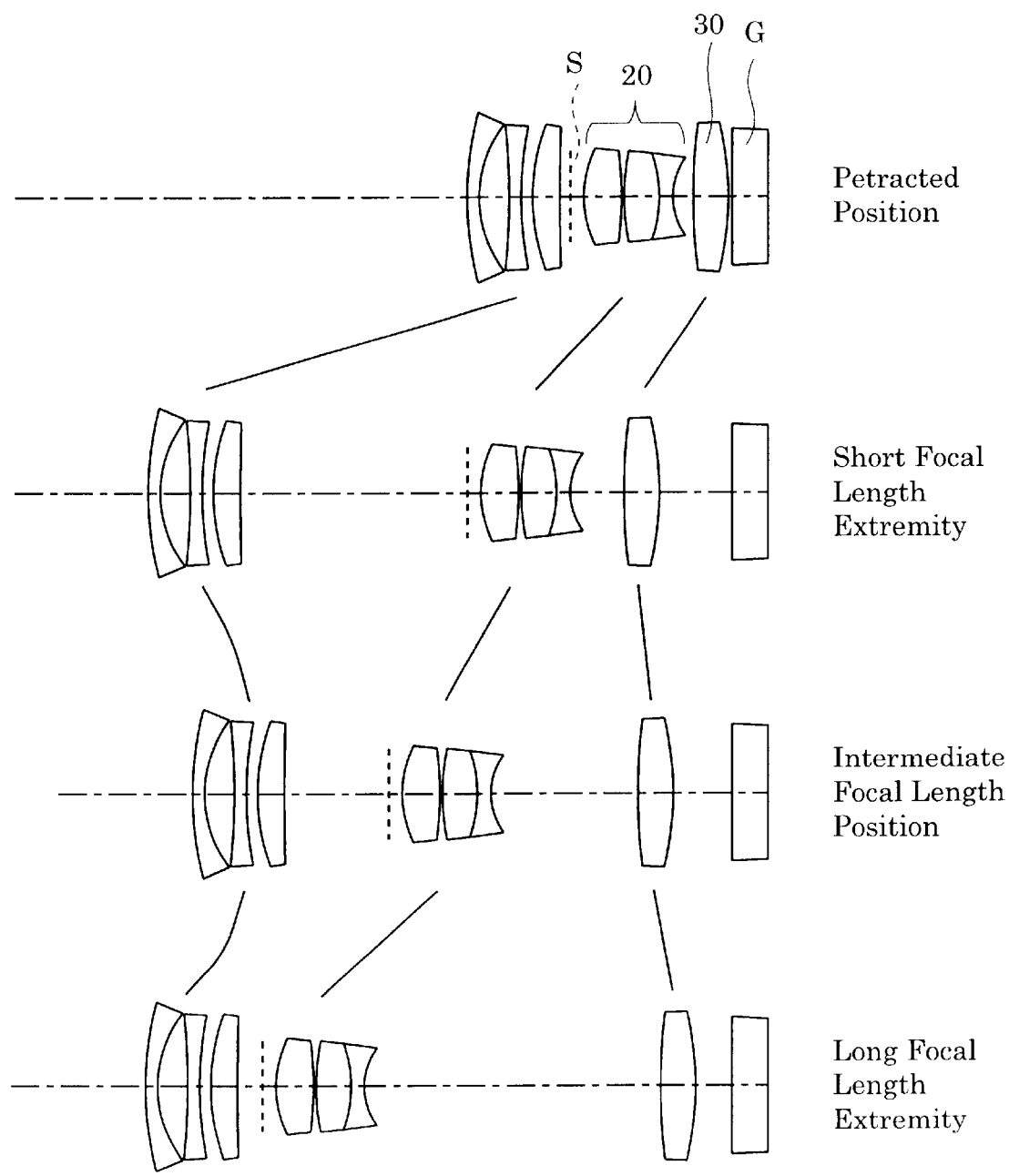
FIG. 29 is schematic lens-group moving paths of the zoom lens system according to the present invention.

The zoom lens system includes, as shown in FIG. 29, a negative first lens group (hereinafter, first lens group) 10, a positive second lens group (hereinafter, second lens group) 20, and a positive third lens group (hereinafter, third lens group) 30, in this order from the object. Upon zooming from the short focal length extremity to the long focal length extremity, the three lens groups moves as follows:

(i) from the short focal length extremity to the intermediate focal length, the first lens group 10 moves toward the image; and, from the intermediate focal length to the long focal length extremity moves, the first lens group 10 moves toward the object;

(ii) the second lens group 20 monotonously moves toward the object; and (iii) the third lens group 30 monotonously moves toward the image.

Focusing is performed by moving the third lens group 30. A diaphragm S is provided in front of the second lens group, and moves together therewith. Filters G are provided behind the third lens group 30, and the imaging surface of a solid-state imaging device (CCD) is provided on the image-side surface of the filters G, or at a position close thereto. Based on the above arrangement of the three lens groups, if an attempt is made to retract the lens groups as close as possible toward the image side, the camera can be made compact, so that a user can easily carry the camera. In order to achieve the above compactness, a retracting operation of the zoom lens system can be performed per lens group, i.e., even if a lens group is arranged to move in association of the movement of another lens group (or to move integrally) in the advanced positions, the lens groups are released from such an associated (integral) movement when the zoom lens system is retracted.

Condition (1) specifies the ratio of the power of the first lens group 10 to the second lens group 20, and is for adequately distributing the negative power of the first lens group 10 and the positive power of the second lens group 20, and at the same time, for achieving miniaturization of the zoom lens system.

If the positive power of the second lens group 20 becomes too strong to the extent that |f1/f2| exceeds the upper limit of condition (1), the correcting of aberrations, such as spherical aberration and the like, is difficult in an well balanced manner, and also difficult to secure an enough back focal distance for providing the filters.

If the positive power of the second lens group 20 becomes too weak to the extent that |f1/f2| exceeds the lower limit of condition (1), the zooming effect of the second lens group 20 becomes smaller, so that the traveling distance thereof becomes longer. As a result, the overall length of the zoom lens system becomes undesirably longer.

Condition (2) specifies the power of the third lens group 30, and is for achieving suitable telecentricity without deteriorating aberrations which have been adequately corrected by the first lens group 10 and the second lens group 20.

If the positive power of the third lens group 30 becomes too strong to the extent that f3/fw exceeds the lower limit of condition (2), the exit pupil is made distant from the image plane, so that better telecentricity can be attained. However, it is difficult to ensure a flatter image plane by correcting of spherical aberration and curvature of field in an well balanced manner.

If the positive power of the third lens group 30 becomes too weak to the extent that f3/fw exceeds the upper limit of condition (2), the refractive power of the third lens group 30 becomes insufficient, so that telecentricity becomes worse, and the traveling distance of the third lens group 30 when focusing is performed thereby is longer, which is disadvantageous for miniaturization of the zoom lens system.

In the zoom lens system of the embodiments, focusing from an object at infinity to an object at a close distance is performed by the third lens group 30. On the other hand, if the first lens group 10 is arranged to perform focusing, it is advantageous to have no focal-point change upon zooming; however, in regard to miniaturization of the zoom lens system when retracted, it is preferable to perform focusing by the third lens group 30, since a lens-driving device for a focusing lens group (third lens group 30) can be miniaturized.

Condition (3) specifies the change in magnification of the third lens group 30 upon zooming from the short focal length extremity to the long focal length extremity. Also, this condition is for achieving desirable telecentricity and, in particular, for reducing the fluctuation of aberrations when focusing carried out by the third lens group 30. In the case where focusing is carried out by the third lens group 30, it is necessary to increase the traveling distance thereof, particularly on the side of the long focal length extremity, in order to perform focusing an object at infinity to an object at a close distance. However, the third lens group 30 has a relatively strong power in order to attain desirable telecentricity, so that curvature of field fluctuates largely upon focusing. In order to eliminate such a drawback, the magnification of the third lens group 30 at the long focal length extremity is made larger than the magnification thereof at the short focal length extremity, as shown in condition (3). In other words, as shown in FIG. 29, at the long focal length extremity, the third lens group 30 is positioned closer to the image than the third lens group 30 is positioned at the short focal length extremity. Due to this arrangement, optical performance for photographing an object at a closer distance can be improved on the side of the long focal length extremity where the traveling distance of a lens group for focusing generally becomes longer.

If m3t/m3w exceeds the upper limit of condition (3), it becomes possible, at the long focal length extremity, to reduce fluctuations of aberrations due to a closer distance; however, the third lens group 30 is too close to the image plane to secure an enough back focal distance.

At the long focal length extremity, if the third lens group 30 is positioned too far from the image plane, compared with the position thereof at the short focal length extremity, to the extent that m3t/m3w exceeds the lower limit of condition (3), both spherical aberration and curvature of field are undesirably overcorrected upon focusing an object at a close distance.

It is preferable that the most image-side surface of the second lens group 20 be a divergent surface constituted by a concave surface. By forming the final surface of the second lens group 20 as the divergent surface, it is possible to orient a bundle of light rays emitted from the second lens group 20 away from the optical axis without making the distance between the second lens group 20 and the third lens 30 longer. Accordingly, the bundle of light rays is effectively refracted by the third lens 30, so that desirable telecentricity can be attained. The above-explained final surface of the second lens group preferably satisfies condition (4).

If the radius of curvature of the final surface of the second lens 20 becomes larger, and the diverging power thereof becomes too weak to the extent that R/fw exceeds the upper limit of condition(4), it becomes necessary to make the distance between the second lens 20 and the third lens 30 longer in order to achieve desirable telecentricity. However, such an increase of the distance therebetween is not preferable from the viewpoint of miniaturization of the zoom lens system.

If the diverging power becomes too strong to the extent that R/fw exceeds the lower limit of condition(4), the positive power of the third lens 30 as well, at the same time, becomes too strong, so that the correcting of spherical aberration and coma is difficult.

The second lens 20 includes a positive lens element with at least one aspherical surface, and cemented lens elements having a positive lens element and a negative lens element, in this order from the object. The aspherical surface of the positive lens element is formed so that the positive power becomes weaker toward the periphery than the positive power generated by a spherical lens surface having a radius of curvature in the paraxial region. Moreover, since the second lens 20 is a zooming lens group, the lens elements thereof have strong power. By constituting the second and third lens elements as cemented lens elements, assembling work of the second lens group 20 can be simplified without deteriorating optical performance due to errors on machining. The cemented lens elements are arranged to satisfy conditions (5) and (6).

Condition (5) specifies the difference of the refractive index of the d-line of the positive lens element and that of the negative lens element. By selecting lens material within the range of condition (5), it becomes possible to correct spherical aberration suitably without deteriorating chromatic aberration.

If the refractive index of the positive lens element becomes too high than that of the negative lens element to the extent that Np−Nn exceeds upper limit of condition(5), spherical aberration is undercorrected.

If Np−Nn exceeds lower limit of condition(5), spherical aberration is overcorrected.

Condition (6) specifies the Abbe numbers of the positive and negative lens elements of the cemented lens elements, and is for suitably correcting chromatic aberration. By suitably combining lens materials within the range of condition (6), it becomes possible to correct, in particular, lateral chromatic aberration at the short focal length extremity, and axial chromatic aberration at the long focal length extremity in a well balanced manner.

On the other hand, the first lens 10 can be constituted by a negative meniscus lens element having the convex surface facing toward the object, a negative lens element, and a positive lens element having a convex surface facing toward the object, in this order from the object. In this case where the first lens 10 is constituted by the three lens groups with the three lens elements, each lens surface of the first lens group can be formed as a spherical surface only. In other words, sufficient optical performance can be obtained without using expensive aspherical lens elements and the like for the first lens 10 in which the diameter thereof tends to be larger.

Alternatively, the first lens 10 can be constituted by a negative lens element having a concave surface facing toward the image, and a positive lens element having a convex surface facing toward the object, in this order from the object. In this case where the first lens 10 is constituted by the two lens group with the two lens elements, if the first lens 10 is provided with at least one aspherical surface on which the positive power becomes stronger toward the periphery than the positive power generated by a spherical lens surface having a radius of curvature in the paraxial region, it becomes possible to effectively reduce distortion at the short focal length extremity, and at the same time, optical performance at the periphery of the view field can be improved.

In the case where the third lens 30 is used as a focusing lens group, the third lens 30 is preferably constituted by a biconvex lens element for the purpose of reducing mechanical load which is otherwise imposed on the focusing lens group. Furthermore, the third lens 30 can achieve sufficient optical performance without employing an aspherical surface; however, by employing an aspherical surface, it is possible to improve optical performance at the periphery of the view field at the short focal length extremity, and improve optical performance on the close-up photography which is performed by further making the shortest photographing distance shorter.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, FNO designates the f-number, f designates the focal length of the entire zoom lens system, W designates the half angle-of-view (°), fB designates the back focal distance (the equivalent air thickness from the most object-side surface (the filters G) to the imaging surface), r designates the radius of curvature, d designates the lens-element thickness or distance between lens elements, Nd designates the refractive index of the d-line (wavelength:588 nm), and ν designates the Abbe number. Furthermore, note that the filters G (plane parallel plate) designates a combined body of a low-pass filter, an infrared-cut filter and a CCD cover glass and the like.

In addition to the above, an aspherical surface which is symmetrical with respect to the optical axis is defined as follows:

$$x = Cy^2/(1+[1-\{1+K\}c^2y^2]^{1/2}) + A4y^4 + A6y^6 + A8y^8 + A10y^{10} \ldots$$

wherein:
c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

The first embodiment of the zoom lens system is shown in FIGS. 1 through 4D. FIG. 1 is the lens arrangement of the zoom lens system. FIGS. 2A through 2D show aberrations occurred in the lens arrangement shown in FIG. 1, at the short focal length extremity. FIGS. 3A through 3D show aberrations occurred in the lens arrangement shown in FIG. 1, at an intermediate focal length position. FIGS. 4A through 4D show aberrations occurred in the lens arrangement shown in FIG. 1, at the long focal length extremity. Table 1 shows the numerical data of the first embodiment.

The first lens 10 includes a negative meniscus lens element having the convex surface facing toward the object, a biconcave lens element, and a positive meniscus lens element having the convex surface facing toward the object. In other words, the first lens 10 is constituted by the three lens groups with the three lens elements.

The second lens 20 includes a biconvex lens element with aspherical surfaces, cemented lens elements having a biconvex lens element and a biconcave lens element, in this order from the object. The aspherical surface formed on each surface of the biconvex lens element is formed so that the positive power becomes weaker toward the periphery than the positive power generated by a spherical lens surface having a radius of curvature in the paraxial region.

The third lens 30 includes a biconvex lens element with aspherical surfaces. The object-side aspherical surface is formed so that the positive power becomes stronger toward the periphery than the positive power generated by a spherical lens surface having a radius of curvature in the paraxial region. On the other hand, the image-side aspherical surface is formed so that the positive power becomes weaker toward the periphery than the positive power generated by a spherical lens surface having a radius of curvature in the paraxial region. The lens-group moving paths of each embodiment are the same as those explained in FIG. 29.

TABLE 1

| Surface No. | r | d | Nd | vd |
|---|---|---|---|---|
| 1 | 24.776 | 0.90 | 1.88300 | 40.8 |
| 2 | 8.950 | 2.24 | — | — |
| 3 | −51.450 | 0.90 | 1.83400 | 37.2 |
| 4 | 27.528 | 0.84 | — | — |
| 5 | 15.465 | 2.00 | 1.84666 | 23.8 |
| 6 | 213.349 | 17.01 − 7.85 − 1.87 | — | — |
| Diaphragm | ∞ | 1.00 | — | — |
| 7* | 7.607 | 2.82 | 1.58913 | 61.2 |
| 8* | −23.232 | 0.20 | — | — |
| 9 | 17.477 | 2.60 | 1.80400 | 46.6 |
| 10 | −9.499 | 1.02 | 1.67270 | 32.1 |
| 11 | 4.856 | 4.02 − 10.94 − 22.08 | — | — |
| 12* | 68.003 | 2.63 | 1.58913 | 61.2 |
| 13* | −19.347 | 5.47 − 4.42 − 2.72 | — | — |
| 14 | ∞ | 2.70 | 1.51633 | 64.1 |
| 15 | ∞ | — | — | — |

*designates the aspherical surface which is rotationally symmetrical with respect to the optical axis.
$F_{NO} = 1:2.7 − 3.6 − 5.3$
$f = 8.00 − 13.50 − 24.00$ (zoom ratio: 3.00)
$W = 31.6 − 19.3 − 11.2$
$fB = 0.0 − 0.0 − 0.0$ Aspherical surface data (the aspherical surface coefficients not indicated are zero (0.00)):

| Surf. No. | K | A4 | A6 | A8 |
|---|---|---|---|---|
| 7 | 0.00 | $-0.30077 \times 10^{-3}$ | $-0.26537 \times 10^{-5}$ | — |
| 8 | 0.00 | $0.23133 \times 10^{-3}$ | — | — |
| 12 | 0.00 | $0.22510 \times 10^{-3}$ | $-0.34352 \times 10^{-5}$ | $0.20734 \times 10^{-8}$ |
| 13 | 0.00 | $0.30000 \times 10^{-3}$ | $-0.51000 \times 10^{-5}$ | — |

Embodiment 2

The second embodiment of the zoom lens system is shown in FIGS. 5 through 8D. FIG. 5 is the lens arrangement of the zoom lens system. FIGS. 6A through 6D show aberrations occurred in the lens arrangement shown in FIG. 5, at the short focal length extremity. FIGS. 7A through 7D show aberrations occurred in the lens arrangement shown in FIG. 5, at an intermediate focal length position. FIGS. 8A through 8D show aberrations occurred in the lens arrangement shown in FIG. 5, at the long focal length extremity. Table 2 shows the numerical data of the second embodiment.

The first lens 10 includes a negative meniscus lens element having the convex surface facing toward the object, a negative meniscus lens having the concave surface facing toward the object, and a positive meniscus lens element having the convex surface facing toward the object. In other words, the first lens 10 is constituted by the three lens groups with the three lens elements.

The second lens 20 includes a biconvex lens element with aspherical surfaces, and cemented lens elements having a positive meniscus lens element having the convex surface facing toward the object and a negative meniscus lens element having the convex surface facing toward the object, in this order from the object. In other words, the second lens 20 is constituted by the two lens groups with the three lens elements. The aspherical surface formed on each surface of the biconvex lens element is formed so that the positive power becomes weaker toward the periphery than the positive power generated by a spherical lens surface having a radius of curvature in the paraxial region.

The third lens 30 includes a biconvex lens element with aspherical surfaces. The aspherical surface formed on each surface of the biconvex lens element is formed so that the positive power becomes weaker toward the periphery than the positive power generated by a spherical lens surface having a radius of curvature in the paraxial region.

TABLE 2

| Surface No. | r | d | Nd | vd |
|---|---|---|---|---|
| 1 | 49.691 | 0.80 | 1.80400 | 46.6 |
| 2 | 9.063 | 2.32 | — | — |
| 3 | −39.416 | 1.00 | 1.83481 | 42.7 |
| 4 | −549.112 | 0.32 | — | — |
| 5 | 14.353 | 1.80 | 1.84666 | 23.8 |
| 6 | 35.235 | 16.74 − 8.18 − 3.00 | — | — |
| Diaphragm | ∞ | 1.00 | — | — |
| 7* | 8.822 | 2.66 | 1.59240 | 68.3 |
| 8* | −22.665 | 0.15 | — | — |
| 9 | 11.220 | 2.06 | 1.77250 | 49.6 |
| 10 | 21.034 | 3.00 | 1.84666 | 23.8 |
| 11 | 4.957 | 4.34 − 10.13 − 19.26 | — | — |
| 12* | 78.382 | 3.00 | 1.58913 | 61.2 |
| 13* | −11.839 | 3.36 − 2.94 − 2.26 | — | — |
| 14 | ∞ | 2.70 | 1.51633 | 64.1 |
| 15 | ∞ | — | — | — |

*designates the aspherical surface which is rotationally symmetrical with respect to the optical axis.
$F_{NO} = 1:2.7 − 3.6 − 5.2$
$f = 8.00 − 13.50 − 23.00$ (zoom ratio: 2.88)
$W = 31.8 − 19.0 − 11.5$
$fB = 0.0 − 0.0 − 0.0$ Aspherical surface data (the aspherical surface coefficients not indicated are zero (0.00)):

| Surf. No. | K | A4 | A6 | A8 |
|---|---|---|---|---|
| 7 | 0.00 | $-0.17519 \times 10^{-3}$ | $0.74305 \times 10^{-5}$ | — |
| 8 | 0.00 | $0.15000 \times 10^{-3}$ | $0.96608 \times 10^{-5}$ | — |
| 12 | 0.00 | $0.13432 \times 10^{-4}$ | $-0.99310 \times 10^{-6}$ | $-0.68531 \times 10^{-7}$ |
| 13 | 0.00 | $0.30000 \times 10^{-3}$ | $-0.60000 \times 10^{-5}$ | — |

Embodiment 3

Figure 9:
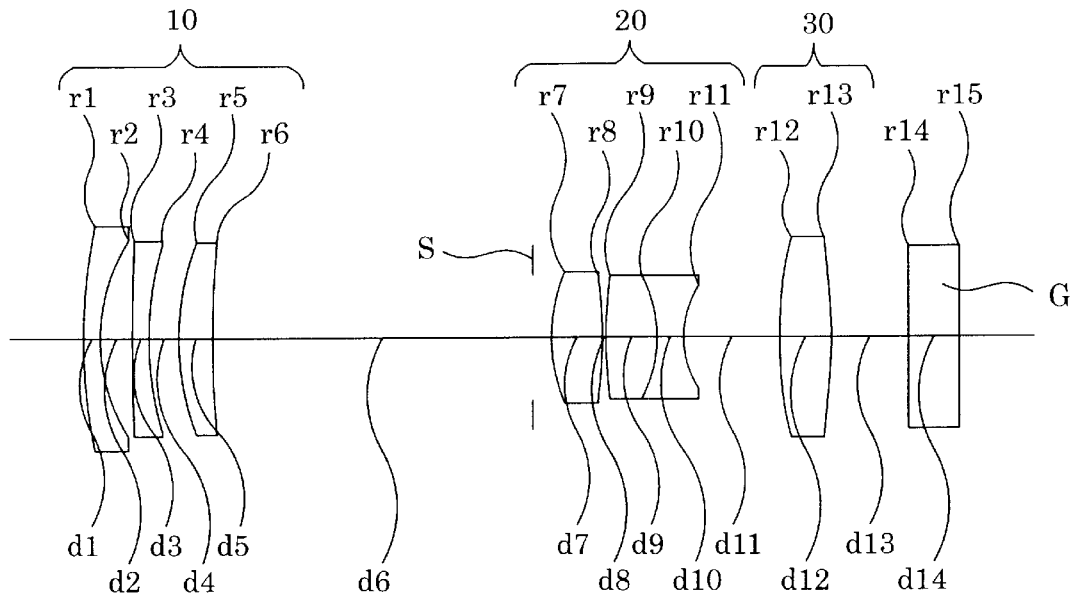
FIG. 9 shows a lens arrangement of a zoom lens system according to a third embodiment of the present invention.
Figure 10A:
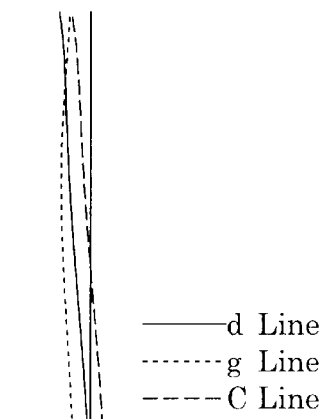
FIGS. 10A, 10B, 10C and 10D show aberrations occurred in the lens arrangement shown in FIG. 9, at the short focal length extremity.
Figure 10B:
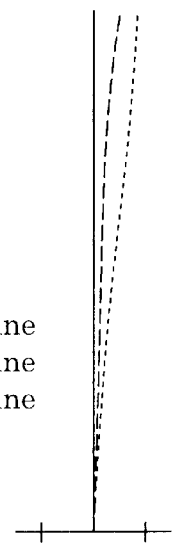
Figure 10C:
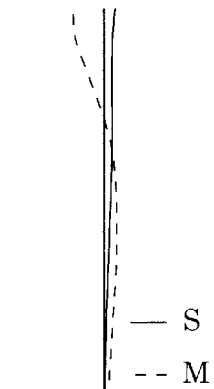
Figure 10D:
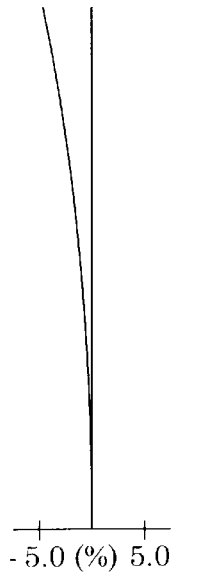

The third embodiment of the zoom lens system is shown in FIGS. 9 through 12D. FIG. 9 is the lens arrangement of the zoom lens system. FIGS. 10A through 10D show aberrations occurred in the lens arrangement shown in FIG. 9, at the short focal length extremity. FIGS. 11A through 11D show aberrations occurred in the lens arrangement shown in FIG. 9, at an intermediate focal length position. FIGS. 12A through 12D show aberrations occurred in the lens arrangement shown in FIG. 9, at the long focal length extremity. Table 3 shows the numerical data of the third embodiment. The first lens group 10 includes a negative meniscus lens element having the convex surface facing toward the object, a negative meniscus lens element having the convex surface facing toward the object, and a positive meniscus lens element having the convex surface facing toward the object, in this order from the object The lens arrangements of the second lens 20 and the third lens 30 are the same the first embodiment.

TABLE 3

| Surface No. | r | d | Nd | vd |
|---|---|---|---|---|
| 1 | 29.268 | 0.90 | 1.88300 | 40.8 |
| 2 | 9.806 | 1.74 | — | — |
| 3 | 123.872 | 0.90 | 1.88300 | 40.8 |
| 4 | 17.456 | 1.62 | — | — |
| 5 | 14.550 | 1.80 | 1.84666 | 23.8 |
| 6 | 55.590 | 17.19 – 7.84 – 2.49 | — | — |
| Diaphragm | ∞ | 1.00 | — | — |
| 7* | 8.556 | 2.75 | 1.69350 | 53.2 |
| 8* | −21.441 | 0.20 | — | — |
| 9 | 25.907 | 2.74 | 1.83400 | 37.2 |
| 10 | −6.963 | 1.44 | 1.72825 | 28.5 |
| 11 | 5.084 | 5.17 – 11.29 – 20.31 | — | — |
| 12* | 34.734 | 2.78 | 1.58913 | 61.2 |
| 13* | −21.730 | 4.12 – 3.67 – 3.01 | — | — |
| 14 | ∞ | 2.70 | 1.51633 | 64.1 |
| 15 | ∞ | — | — | — |

*designates the aspherical surface which is rotationally symmetrical with respect to the optical axis.
$F_{NO} = 1:2.7 – 3.6 – 4.9$
$f = 8.00 – 13.50 – 22.20$ (Zoom Ratio: 2.78)
$W = 31.6 – 19.2 – 11.9$
$fB = 0.0 – 0.0 – 0.0$ Aspherical surface data (the aspherical surface coefficients not indicated are zero (0.00)):

| Surf. No. | K | A4 | A6 | A8 |
|---|---|---|---|---|
| 7 | 0.00 | $-0.25880 \times 10^{-3}$ | $-0.20300 \times 10^{-3}$ | — |
| 8 | 0.00 | $0.21482 \times 10^{-3}$ | — | — |
| 12 | 0.00 | $0.40156 \times 10^{-3}$ | $-0.57537 \times 10^{-3}$ | $0.37127 \times 10^{-7}$ |
| 13 | 0.00 | $0.54638 \times 10^{-3}$ | $-0.72888 \times 10^{-3}$ | — |

Embodiment 4

Figure 13:
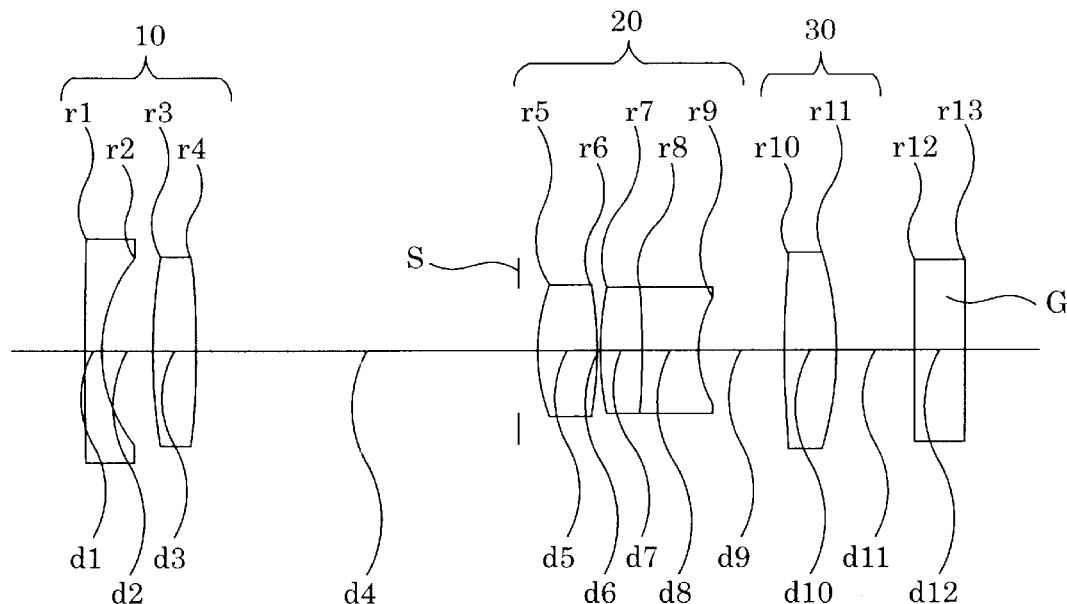
FIG. 13 shows a lens arrangement of a zoom lens system according to a fourth embodiment of the present invention.
Figure 14A:
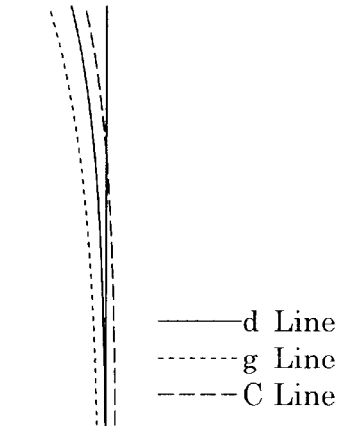
FIGS. 14A, 14B, 14C and 14D show aberrations occurred in the lens arrangement shown in FIG. 13, at the short focal length extremity.
Figure 14B:
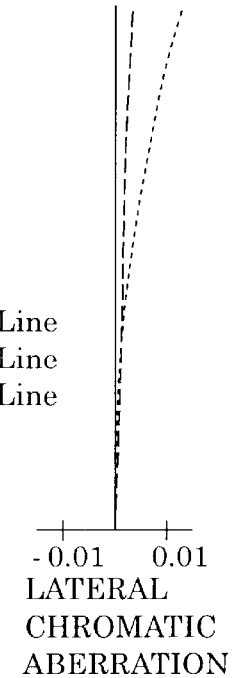
Figure 14C:
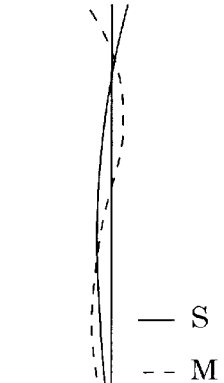
Figure 14D:
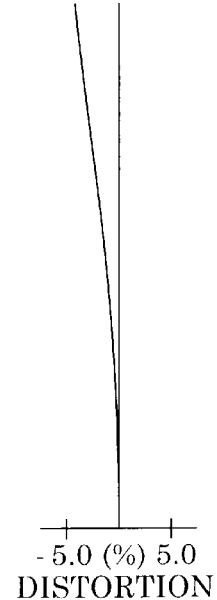
Figure 15A:
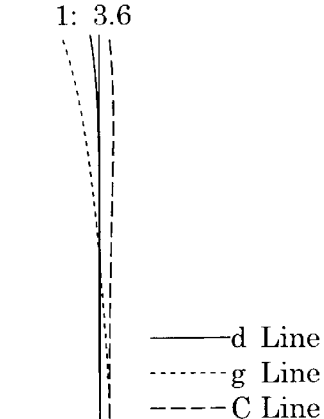
FIGS. 15A, 15B, 15C and 15D show aberrations occurred in the lens arrangement shown in FIG. 13, at an intermediate focal length position.
Figure 15B:
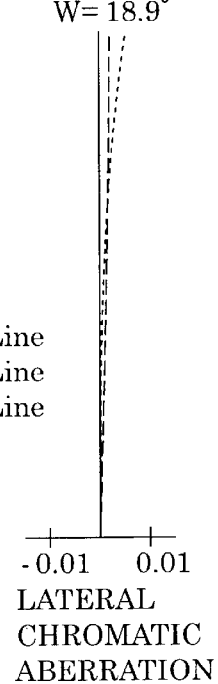
Figure 15C:
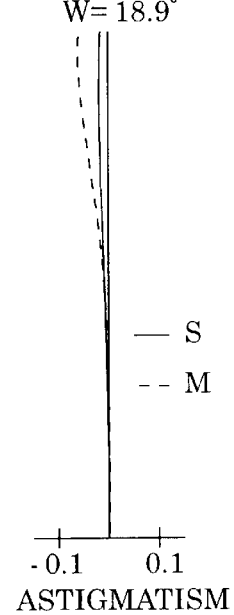
Figure 15D:
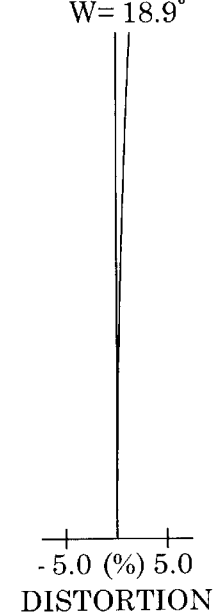
Figure 16A:
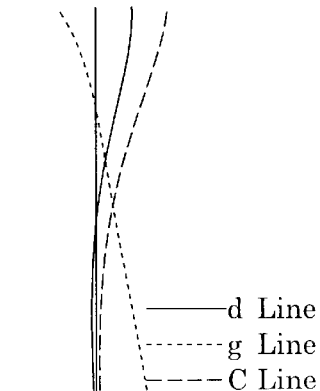
FIGS. 16A, 16B, 16C and 16D show aberrations occurred in the lens arrangement shown in FIG. 13, at the long focal length extremity.
Figure 16B:
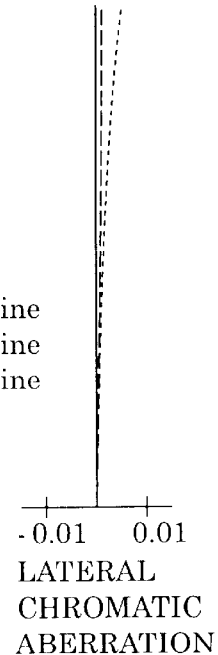
Figure 16C:
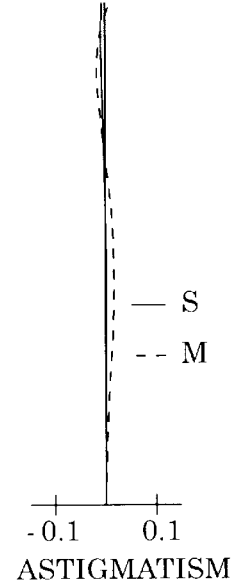
Figure 16D:
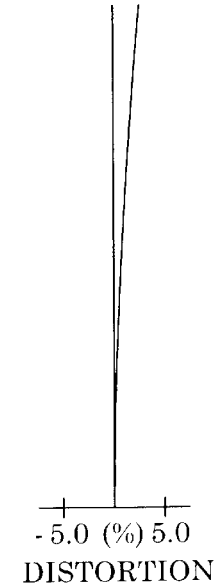
Figure 19A:
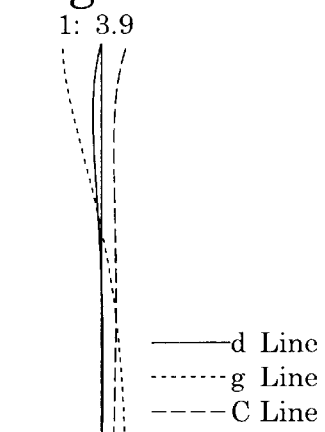
FIGS. 19A, 19B, 19C and 19D show aberrations occurred in the lens arrangement shown in FIG. 17, at an intermediate focal length position.
Figure 19B:
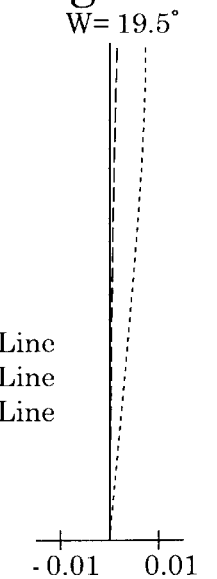
Figure 19C:
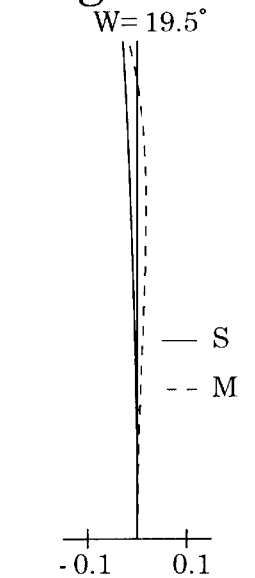
Figure 19D:
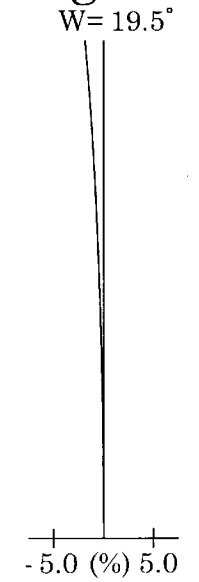
Figure 20A:
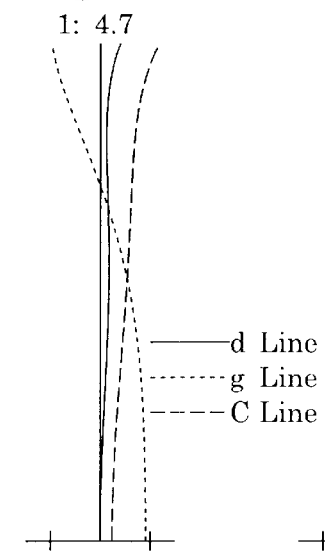
FIGS. 20A, 20B, 20C and 20D show aberrations occurred in the lens arrangement shown in FIG. 17, at the long focal length extremity.
Figure 20B:
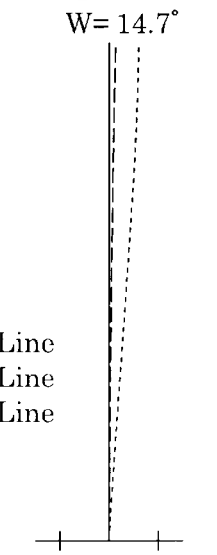
Figure 20C:
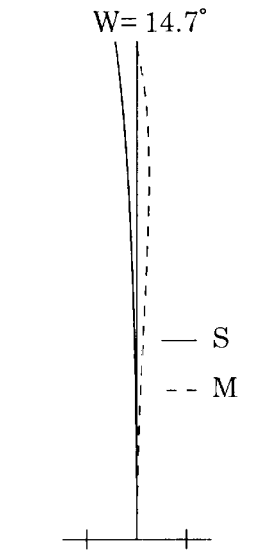
Figure 20D:
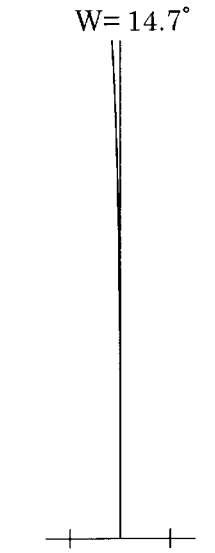
Figure 27A:
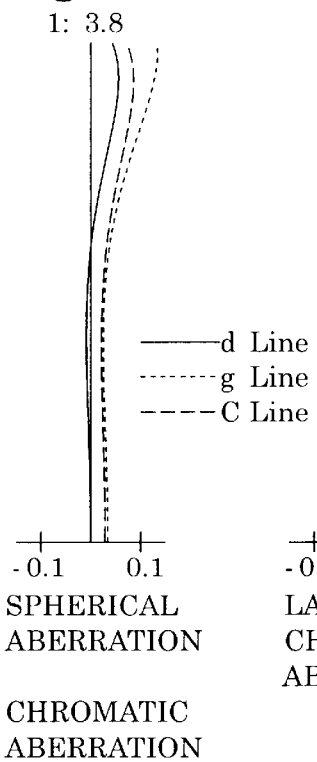
FIGS. 27A, 27B, 27C and 27D show aberrations occurred in the lens arrangement shown in FIG. 25, at an intermediate focal length position.
Figure 27B:
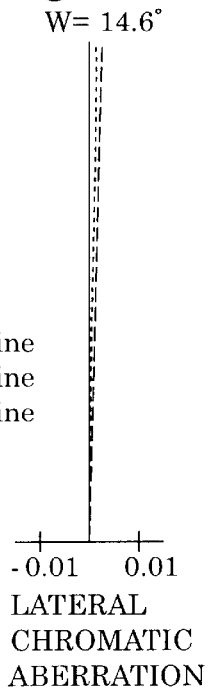
Figure 27C:
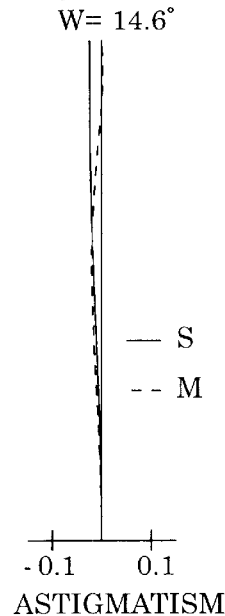
Figure 27D:
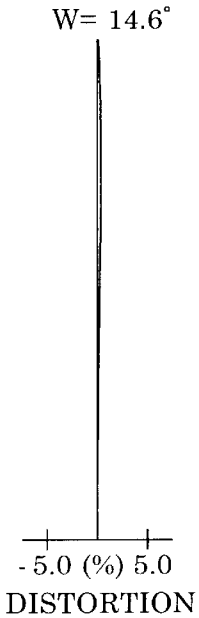
Figure 28A:
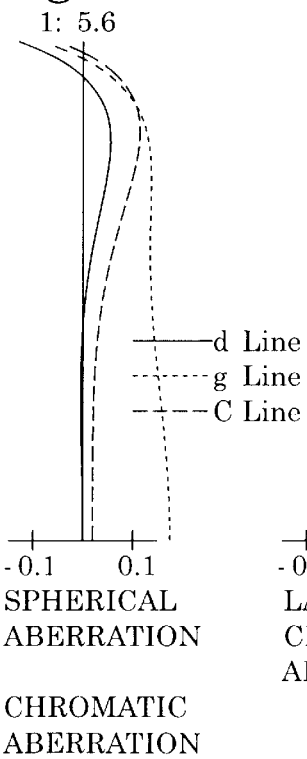
FIGS. 28A, 28B, 28C and 28D show aberrations occurred in the lens arrangement shown in FIG. 25, at the long focal length extremity.
Figure 28B:
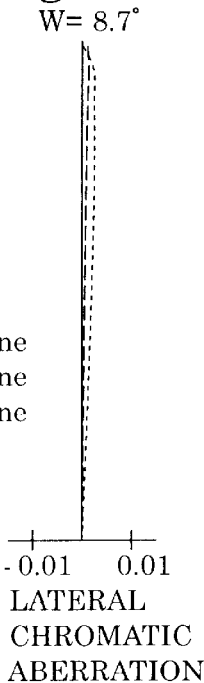
Figure 28C:
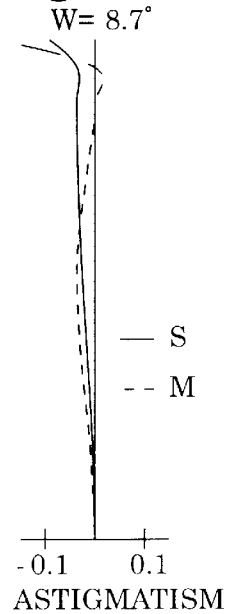
Figure 28D:
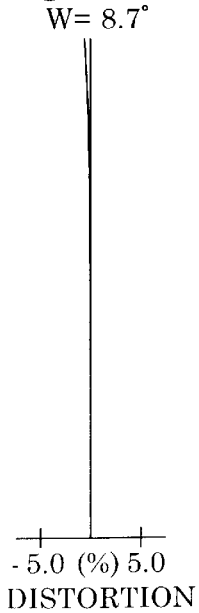

The fourth embodiment of the zoom lens system is shown in FIGS. 13 through 16D. FIG. 13 is the lens arrangement of a zoom lens system. FIGS. 14A through 14D show aberrations occurred in the lens arrangement shown in FIG. 13, at the short focal length extremity. FIGS. 15A through 15D show aberrations occurred in the lens arrangement shown in FIG. 13, at an intermediate focal length position. FIGS. 16A through 16D show aberrations occurred in the lens arrangement shown in FIG. 13, at the long focal length extremity. Table 4 shows the numerical data of the fourth embodiment.

The first lens 10 includes a negative meniscus lens element having the convex surface facing toward the object, and a biconvex lens element with an aspherical surface on the image-side surface thereof. In other words, the first lens 10 is constituted by the two lens groups with the two lens elements. The image-side aspherical surface of the biconvex lens element is formed so that the positive power becomes stronger toward the periphery than the positive power generated by a spherical lens surface having a radius of curvature in the paraxial region.

The second lens 20 includes a biconvex lens element with aspherical surfaces, and cemented lens elements having a biconvex lens element and a biconcave lens element, in this order from the object. In other words, the second lens 20 is constituted by the two lens groups with the three lens elements. The aspherical surface formed on each surface of the biconvex lens element is formed so that the positive power becomes weaker toward the periphery than the positive power generated by a spherical lens surface having a radius of curvature in the paraxial region.

The third lens 30 includes a biconvex lens element with an aspherical surface on the object-side thereof. The object-side aspherical surface is formed so that the positive power becomes weaker toward the periphery than the positive power generated by a spherical lens surface formed with a radius of curvature in the paraxial region.

TABLE 4

| Surface No. | r | d | Nd | vd |
|---|---|---|---|---|
| 1 | 323.245 | 0.90 | 1.80400 | 46.6 |
| 2 | 7.947 | 2.75 | — | — |
| 3 | 31.421 | 2.30 | 1.80518 | 25.4 |
| 4* | −75.831 | 17.38 – 7.92 – 2.50 | — | — |
| Diaphragm | ∞ | 1.00 | — | — |
| 5* | 9.590 | 3.20 | 1.59240 | 68.3 |
| 6* | −19.086 | 0.17 | — | — |
| 7 | 17.125 | 2.25 | 1.80400 | 46.6 |
| 8 | −45.862 | 3.02 | 1.72825 | 28.5 |
| 9 | 5.699 | 4.59 – 10.83 – 19.96 | — | — |
| 10* | 41.711 | 2.80 | 1.58913 | 61.2 |
| 11 | −18.400 | 4.17 – 3.69 – 2.99 | — | — |
| 12 | ∞ | 2.70 | 1.51633 | 64.1 |
| 13 | ∞ | — | — | — |

*designates the aspherical surface which is rotationally symmetrical with respect to the optical axis.
$F_{NO} = 1:2.7 – 3.6 – 5.0$
$f = 8.00 – 13.50 – 22.20$ (Zoom Ratio: 2.78)
$W = 31.5 – 18.9 – 11.7$
$fB = 0.0 – 0.0 – 0.0$ Aspherical surface data (the aspherical surface coefficients not indicated are zero (0.00)):

| Surf. No. | K | A4 | A6 | A8 |
|---|---|---|---|---|
| 4 | 0.00 | $-0.15872 \times 10^{-3}$ | $0.44437 \times 10^{-6}$ | $-0.46622 \times 10^{-7}$ |
| 5 | 0.00 | $-0.18809 \times 10^{-3}$ | — | — |
| 6 | 0.00 | $0.12990 \times 10^{-3}$ | — | — |
| 10 | 0.00 | $-0.15400 \times 10^{-3}$ | $0.20050 \times 10^{-5}$ | $-0.34241 \times 10^{-7}$ |

Embodiment 5

The fifth embodiment of the zoom lens system is shown in FIGS. 17 through 20D. FIG. 17 is the lens arrangement of the zoom lens system. FIGS. 18A through 18D show aberrations occurred in the lens arrangement shown in FIG. 17, at the short focal length extremity. FIGS. 19A through 19D show aberrations occurred in the lens arrangement shown in FIG. 17, at an intermediate focal length position. FIGS. 20A through 20D show aberrations occurred in the lens arrangement shown in FIG. 17, at the long focal length extremity. Table 5 shows the numerical data of the fifth embodiment.

The first lens 10 includes a negative meniscus lens element having the convex surface facing toward the object, and a positive meniscus lens element having the convex surface facing toward the object, in this order from the object. The negative meniscus lens element has an aspherical surface on the object-side surface thereof. The aspherical surface is formed so that the positive power becomes stronger toward the periphery than the positive power generated by a spherical lens surface having a radius of curvature in the paraxial region.

The second lens 20 includes a biconvex lens element with aspherical surfaces, and cemented lens elements having a positive meniscus lens element having the convex surface facing toward the object and a negative meniscus lens element having the convex surface facing toward the object, in this order from the object. In other words, the second lens 20 is constituted by the two lens group with the three lens elements. The aspherical surface formed on each surface of the biconvex lens element is formed so that the positive power becomes weaker toward the periphery than the positive power generated by a spherical lens surface having a radius of curvature in the paraxial region.

The third lens 30 includes a biconvex lens element with an aspherical surface on the object-side thereof. The object-side aspherical surface is formed so that the positive power becomes weaker toward the periphery than the positive power generated by a spherical lens surface having a radius of curvature in the paraxial region.

This embodiment is an example in which the focal length at the short focal length extremity is made shorter to the extent that the half angle-of-view threat is about 33°, while the zoom ratio is reduced to 2.4, so that further miniaturization of the zoom lens system can be attained.

TABLE 5

| Surface No. | r | d | Nd | vd |
|---|---|---|---|---|
| 1* | 432.332 | 1.20 | 1.80610 | 40.9 |
| 2 | 7.149 | 2.41 | — | — |
| 3 | 11.659 | 1.96 | 1.84666 | 23.8 |
| 4 | 33.548 | 14.52 – 5.39 – 2.50 | — | — |
| Diaphragm | ∞ | 1.00 | — | — |
| 5* | 7.332 | 2.34 | 1.69350 | 53.2 |
| 6* | −20.821 | 0.10 | — | — |
| 7 | 13.764 | 2.00 | 1.84100 | 43.2 |
| 8 | 46.416 | 1.00 | 1.84666 | 23.8 |
| 9 | 4.758 | 3.58 – 11.04 – 16.09 | — | — |
| 10* | 15.030 | 2.98 | 1.58913 | 61.2 |
| 11* | −55.816 | 4.21 – 3.49 – 3.00 | — | — |
| 12 | ∞ | 2.70 | 1.51633 | 64.1 |
| 13 | ∞ | — | — | — |

*designates the aspherical surface which is rotationally symmetrical with respect to the optical axis.
$F_{NO}$ = 1:2.7 – 3.9 – 4.7
f = 7.50 – 13.50 – 18.00 (Zoom Ratio: 2.40)
W = 33.3 – 19.5 – 14.7
fB = 0.0 – 0.0 – 0.0

Aspherical surface data (the aspherical surface coefficients not indicated are zero (0.00)):

| Surf. No. | K | A4 | A6 | A8 |
|---|---|---|---|---|
| 1 | 0.00 | $0.15034 \times 10^{-3}$ | $-0.99495 \times 10^{-7}$ | — |
| 5 | 0.00 | $-0.32552 \times 10^{-3}$ | — | $-0.13943 \times 10^{-6}$ |
| 6 | 0.00 | $0.21404 \times 10^{-3}$ | — | — |
| 10 | 0.00 | $0.26028 \times 10^{-4}$ | — | — |
| 11 | 0.00 | $0.40799 \times 10^{-4}$ | $-0.89583 \times 10^{-6}$ | — |

Embodiment 6

The sixth embodiment of the zoom lens system is shown in FIGS. 21 through 24D. FIG. 21 is the lens arrangement of the zoom lens system. FIGS. 22A through 22D show aberrations occurred in the lens arrangement shown in FIG. 21, at the short focal length extremity. FIGS. 23A through 23D show aberrations occurred in the lens arrangement shown in FIG. 21, at an intermediate focal length position. FIGS. 24A through 24D show aberrations occurred in the lens arrangement shown in FIG. 21, at the long focal length extremity. Table 6 shows the numerical data of the sixth embodiment.

The first lens 10 includes a negative meniscus lens element having the convex surface facing toward the object, and a positive meniscus lens element having the convex surface facing toward the object, in this order from the object. In other words, the first lens 10 is constituted by the two lens groups with the two lens elements. The negative meniscus lens element has an aspherical surface on the object-side surface thereof. The object-side aspherical surface is formed so that the positive power becomes stronger toward the periphery than the positive power generated by a spherical lens surface having a radius of curvature in the paraxial region.

The second lens 20 includes a biconvex lens element with aspherical surfaces, and cemented lens elements having a biconvex lens element and a biconcave lens element, in this order from the object. In other words, the second lens 20 is constituted by the two lens groups with the three lens elements. The aspherical surface formed on each surface of the biconvex lens element is formed so that the positive power becomes weaker toward the periphery than the positive power generated by a spherical lens surface having a radius of curvature in the paraxial region.

The third lens 30 includes a biconvex lens element with spherical surfaces formed on both surfaces thereof.

In this embodiment, sufficient optical performance similar to that of the other embodiments can be achieved, though the third lens 30 is constituted by a spherical lens element for the purpose of cost-reduction.

TABLE 6

| Surface No. | r | d | Nd | vd |
|---|---|---|---|---|
| 1* | 1863.387 | 1.00 | 1.69350 | 53.2 |
| 2 | 8.149 | 3.90 | — | — |
| 3 | 13.310 | 1.74 | 1.84666 | 23.8 |
| 4 | 22.638 | 18.85–8.50–2.56 | — | — |
| Diaphragm | ∞ | 1.00 | — | — |
| 5* | 7.991 | 2.89 | 1.58913 | 61.2 |
| 6* | −22.555 | 0.10 | — | — |
| 7 | 12.731 | 2.30 | 1.80400 | 46.6 |
| 8 | −95.755 | 1.00 | 1.74077 | 27.8 |
| 9 | 5.115 | 6.25–12.68–21.95 | — | — |
| 10 | 29.496 | 2.00 | 1.69350 | 53.2 |
| 11 | −43.754 | 4.77–4.13–3.20 | — | — |
| 12 | ∞ | 2.70 | 1.51633 | 64.1 |
| 13 | ∞ | — | — | — |

*designates the aspherical surface which is rotationally symmetrical with respect to the optical axis.
$F_{NO}$ =1:2.7 – 3.5 – 4.9
f = 8.00 – 13.50 – 22.20 (Zoom Ratio: 2.78)
W = 31.5 – 19.4 – 11.9
fB = 0.0 – 0.0 – 0.0

Aspherical surface data (the aspherical surface coefficients not indicated are zero (0.00)):

| Surf. No. | K | A4 | A6 | A8 |
|---|---|---|---|---|
| 1 | 0.00 | $0.10127 \times 10^{-3}$ | $-0.77813 \times 10^{-7}$ | — |
| 5 | 0.00 | $-0.23242 \times 10^{-3}$ | $-0.16565 \times 10^{-5}$ | — |
| 6 | 0.00 | $0.15153 \times 10^{-3}$ | — | — |

Embodiment 7

The seventh embodiment of the zoom lens system is shown in FIGS. 25 through 28D. FIG. 25 is the lens arrangement of the zoom lens system. FIGS. 26A through 26D show aberrations occurred in the lens arrangement shown in FIG. 25, at the short focal length extremity. FIGS. 27A through 27D show aberrations occurred in the lens arrangement shown in FIG. 25, at an intermediate focal length position. FIGS. 28A through 28D show aberrations occurred in the lens arrangement shown in FIG. 25, at the long focal length extremity. Table 7 shows the numerical data of the seventh embodiment.

The first lens 10 includes a negative meniscus lens element having the convex surface facing toward the object, a biconcave lens element, and a plano-convex lens element having the convex surface facing toward the object, in this order from the object. In other words, the first lens 10 is constituted by the three lens groups with the three lens elements.

The second lens 20 includes a biconvex lens element with aspherical surfaces, and cemented lens elements having a biconvex lens element and a biconcave lens element, in this order from the object. The aspherical surface formed on each surface of the biconvex lens element is formed so that the positive power becomes weaker toward the periphery than the positive power generated by a spherical lens surface having a radius of curvature in the paraxial region.

The third lens 30 includes a biconvex lens element with aspherical surfaces. The object-side aspherical surface is formed so that the positive power becomes stronger toward the periphery than the positive power generated by a spherical lens surface formed having a radius of curvature in the paraxial region. On the other hand, the image-side aspherical surface is formed so that the positive power becomes weaker toward the periphery than the positive power generated by a spherical lens surface formed having a radius of curvature in the paraxial region.

In this embodiment, the zoom ratio is increased up to about 4 under the condition that the lens arrangement is substantially the same as the first embodiment. Sufficient optical performance can be achieved up to the long focal length extremity, though the f-number at the long focal length extremity is 5.6 which is somewhat darker.

TABLE 7

| Surface No. | r | d | Nd | vd |
|---|---|---|---|---|
| 1 | 22.970 | 0.90 | 1.88300 | 40.8 |
| 2 | 9.288 | 2.75 | — | — |
| 3 | −37.731 | 0.90 | 1.83400 | 37.2 |
| 4 | 37.731 | 0.96 | — | — |
| 5 | 18.441 | 2.10 | 1.84666 | 23.8 |
| 6 | ∞ | 22.03–6.56–1.30 | — | — |
| Diaphragm | ∞ | 0.70 | — | — |
| 7* | 9.226 | 2.82 | 1.58913 | 61.2 |
| 8* | −23.379 | 0.27 | — | — |
| 9 | 21.896 | 2.95 | 1.80400 | 46.6 |
| 10 | −9.473 | 2.18 | 1.67270 | 32.1 |
| 11 | 5.443 | 5.21–16.24–28.87 | — | — |
| 12* | 59.247 | 2.60 | 1.58913 | 61.2 |
| 13* | −18.257 | 4.62–3.63–2.49 | — | — |
| 14 | ∞ | 2.70 | 1.51633 | 64.1 |
| 15 | ∞ | — | — | — |

*designates the aspherical surface which is rotationally symmetrical with respect to the optical axis.
$F_{NO}$ = 1:2.4 − 3.8 − 5.6
f = 8.00 − 18.00 − 31.00 (Zoom Ratio: 3.88)
W = 31.8 − 14.6 − 8.7
fB = 0.0 − 0.0 − 0.0

Aspherical surface data (the aspherical surface coefficients not indicated are zero (0.00)):

| Surf. No. | K | A4 | A6 | A8 |
|---|---|---|---|---|
| 7 | 0.00 | −0.19897 × $10^{-3}$ | −0.11901 × $10^{-5}$ | — |
| 8 | 0.00 | 0.15702 × $10^{-3}$ | — | — |
| 12 | 0.00 | 0.20655 × $10^{-3}$ | −0.38057 × $10^{-5}$ | 0.80815 × $10^{-8}$ |
| 13 | 0.00 | 0.30000 × $10^{-3}$ | −0.50000 × $10^{-5}$ | — |

Numerical values of each condition of each embodiment are shown in Table 8.

TABLE 8

| | Embod. 1 | Embod. 2 | Embod. 3 | Embod. 4 | Embod. 5 |
|---|---|---|---|---|---|
| Cond. (1) | 1.375 | 1.470 | 1.366 | 1.361 | 1.451 |
| Cond. (2) | 3.232 | 2.210 | 2.889 | 2.757 | 2.722 |
| Cond. (3) | 1.152 | 1.089 | 1.067 | 1.077 | 1.093 |
| Cond. (4) | 0.607 | 0.620 | 0.636 | 0.712 | 0.634 |
| Cond. (5) | 0.131 | −0.074 | 0.106 | 0.076 | −0.006 |
| Cond. (6) | 14.5 | 25.8 | 8.7 | 18.1 | 19.4 |

| | Embod. 6 | Embod. 7 |
|---|---|---|
| Cond. (1) | 1.348 | 1.368 |
| Cond. (2) | 3.212 | 2.999 |
| Cond. (3) | 1.085 | 1.124 |
| Cond. (4) | 0.639 | 0.680 |
| Cond. (5) | 0.063 | 0.131 |
| Cond. (6) | 18.8 | 14.5 |

As can be understood from the Table 8, the numerical values of each embodiment satisfy each condition. Furthermore, as can be understood from the aberration diagrams, the various aberrations are adequately corrected.

According to the above description, a zoom lens system, which (i) is used in a small and light-weight video camera or digital camera and the like having the f-number of more than 1:2.8 at the short focal length extremity, and a zoom ratio of 2.5 to 4.0, (ii) has the half angle-of-view of more than 30° at the short focal length extremity, (iii) has sufficient image-forming property suitable for a solid-state imaging device of higher resolution, and (iv) can be made much compact when retracted, can be obtained.

What is claimed is:

1. A zoom lens system comprising a negative first lens group, a positive second lens group, and a positive third lens group, in this order from an object, wherein zooming is performed by moving said first to third lens groups respectively along the optical axis; and wherein said zoomlens system satisfies the following conditions:

3<|f1/f2|<1.8

2.0<f3/fw<3.4

1.05<m3t/m3w<1.25 wherein fw designates the focal length of the entire the zoom lens system at the short focal length extremity;

f1 designates the focal length of said first lens group;

f2 designates the focal length of said second lens group;

f3 designates the focal length of said third lens group;

m3w designates the magnification of said third lens group at the short focal length extremity, when an object at infinity is in an in-focus state;

m3t designates the magnification of said third lens group at the long focal length extremity, when an object at infinity is in an in-focus state.

2. A zoom lens system according to claim 1, wherein the most image-side surface of said positive second lens group comprises a divergent surface comprising a concave surface, and satisfies the following condition:

$$0.4 < R/fw < 1.0$$

wherein

R designates the radius of curvature of the most image-side surface of said positive second lens group.

3. A zoom lens system according to claim 1, wherein said positive second lens group comprises a positive lens element with at least one aspherical surface, and cemented lens elements comprising a positive lens element and a negative lens element, in this order from said object, wherein said aspherical surface is formed so that the positive power becomes weaker toward the periphery than the positive power generated by a spherical lens surface having a radius of curvature in the paraxial region; and wherein said second lens group satisfies the following conditions:

$$-0.1 < Np - Nn < 0.2$$

$$5 < vp - vn < 30$$

wherein

Np designates the refractive index of the d-line of said positive lens element of said cemented lens elements;

Nn designates the refractive index of the d-line of said negative lens element of said cemented lens elements;

vp designates the Abbe number of said positive lens element of said cemented lens elements; and vn designates the Abbe number of said negative lens element of said cemented lens elements.

4. A zoom lens system according to claim 1, wherein said negative first lens group comprises a negative meniscus lens element having the convex surface facing toward said object, a negative lens element, and a positive lens element having a convex surface facing toward said object, in this order from said object, wherein each lens surface of said first lens group comprises a spherical surface.

5. A zoom lens system according to claim 1, wherein said negative first lens group comprises a negative lens element having a concave surface facing toward an image, and a positive lens element having a convex surface facing toward said object, in this order from said object, wherein said negative first lens group comprises at least one aspherical surface on which the positive power becomes stronger toward the periphery than the positive power generated by a spherical lens surface having a radius of curvature in the paraxial region.

6. A zoom lens system according to claim 1, wherein said positive third lens group comprises a biconvex lens element.

7. A zoom lens system according to claim 1, wherein said positive third lens group comprises a focusing lens group.

* * * * *